US 9,291,846 B2

(12) United States Patent
Yoon et al.

(10) Patent No.: US 9,291,846 B2
(45) Date of Patent: Mar. 22, 2016

(54) DISPLAY PANEL, DISPLAY APPARATUS INCLUDING THE SAME AND METHOD OF MANUFACTURING THE SAME

(71) Applicant: Samsung Display Co., LTD., Yongin, Gyeonggi-Do (KR)

(72) Inventors: Hyung-Guen Yoon, Hwaseong-si (KR); Eung-Gyu Lee, Cheonan-si (KR); Jin-Suek Kim, Daejeon (KR); Sae-Ron Park, Gimhae-si (KR); Dae-Ho Song, Hwaseong-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/455,031

(22) Filed: Aug. 8, 2014

(65) Prior Publication Data
US 2015/0241749 A1    Aug. 27, 2015

(30) Foreign Application Priority Data

Feb. 27, 2014    (KR) .................. 10-2014-0023009

(51) Int. Cl.
| G02F 1/1339 | (2006.01) |
| G02F 1/1333 | (2006.01) |
| G02F 1/1362 | (2006.01) |
| G02F 1/1335 | (2006.01) |
| G02F 1/1343 | (2006.01) |

(52) U.S. Cl.
CPC ........ G02F 1/133377 (2013.01); G02F 1/1343 (2013.01); G02F 1/133528 (2013.01); G02F 1/136286 (2013.01)

(58) Field of Classification Search
CPC .................. G02F 1/133707; G02F 1/133377; G02F 1/133509–1/133512; G02F 1/1339–1/13394

USPC .................................................. 349/155–158
See application file for complete search history.

(56) References Cited

U.S. PATENT DOCUMENTS

| 7,411,641 | B2 | 8/2008 | Hu et al. | |
| 8,456,584 | B2 * | 6/2013 | Koo | ............................... 349/40 |
| 2007/0076139 | A1 * | 4/2007 | Bae | ................................ 349/58 |
| 2009/0310055 | A1 * | 12/2009 | Kim et al. | ..................... 349/58 |

(Continued)

FOREIGN PATENT DOCUMENTS

| JP | 2004-205769 A | 7/2004 |
| JP | 2012-145779 A | 8/2012 |

(Continued)

*Primary Examiner* — Anne Hines
*Assistant Examiner* — Jose M Diaz
(74) *Attorney, Agent, or Firm* — Cantor Colburn LLP

(57) ABSTRACT

A display panel includes a base substrate, a gate line disposed under the base substrate and extending in a first direction, a data line disposed under the base substrate and extends in a second direction substantially perpendicular to the first direction, a thin film transistor disposed under the base substrate, and electrically connected to the gate line and the data line, a first electrode disposed under the base substrate and electrically connected to the thin film transistor, an image displaying portion disposed under the first electrode and overlapped with the first electrode, a protecting layer disposed under the image displaying portion, surrounding a lower surface of the image displaying portion and both sides of the image displaying portion in the second direction, and including a protrusion wall protruded in a direction opposite to the base substrate, and an upper polarizer disposed on the base substrate.

20 Claims, 28 Drawing Sheets

(56) References Cited

U.S. PATENT DOCUMENTS

| | | |
|---|---|---|
| 2010/0014036 A1 | 1/2010 | Caplet |
| 2010/0020258 A1* | 1/2010 | Chang ............................. 349/46 |
| 2010/0277663 A1* | 11/2010 | Koo ................................ 349/58 |
| 2013/0182203 A1* | 7/2013 | Lee et al. ....................... 349/106 |
| 2013/0229601 A1 | 9/2013 | Nakano et al. |
| 2013/0293799 A1* | 11/2013 | Lee et al. ........................ 349/42 |
| 2013/0313582 A1* | 11/2013 | Cho et al. ........................ 257/88 |
| 2014/0118673 A1* | 5/2014 | Park et al. ..................... 349/138 |
| 2014/0125908 A1* | 5/2014 | Hong et al. ..................... 349/44 |
| 2014/0293199 A1* | 10/2014 | Sakae et al. ................... 349/106 |
| 2014/0347611 A1* | 11/2014 | Kim et al. ..................... 349/106 |
| 2014/0362333 A1* | 12/2014 | Oono ............................. 349/138 |
| 2015/0002774 A1* | 1/2015 | Choi et al. ....................... 349/43 |

FOREIGN PATENT DOCUMENTS

| | | |
|---|---|---|
| KR | 1020050095099 A | 9/2005 |
| KR | 10-0696282 B1 | 3/2007 |

* cited by examiner

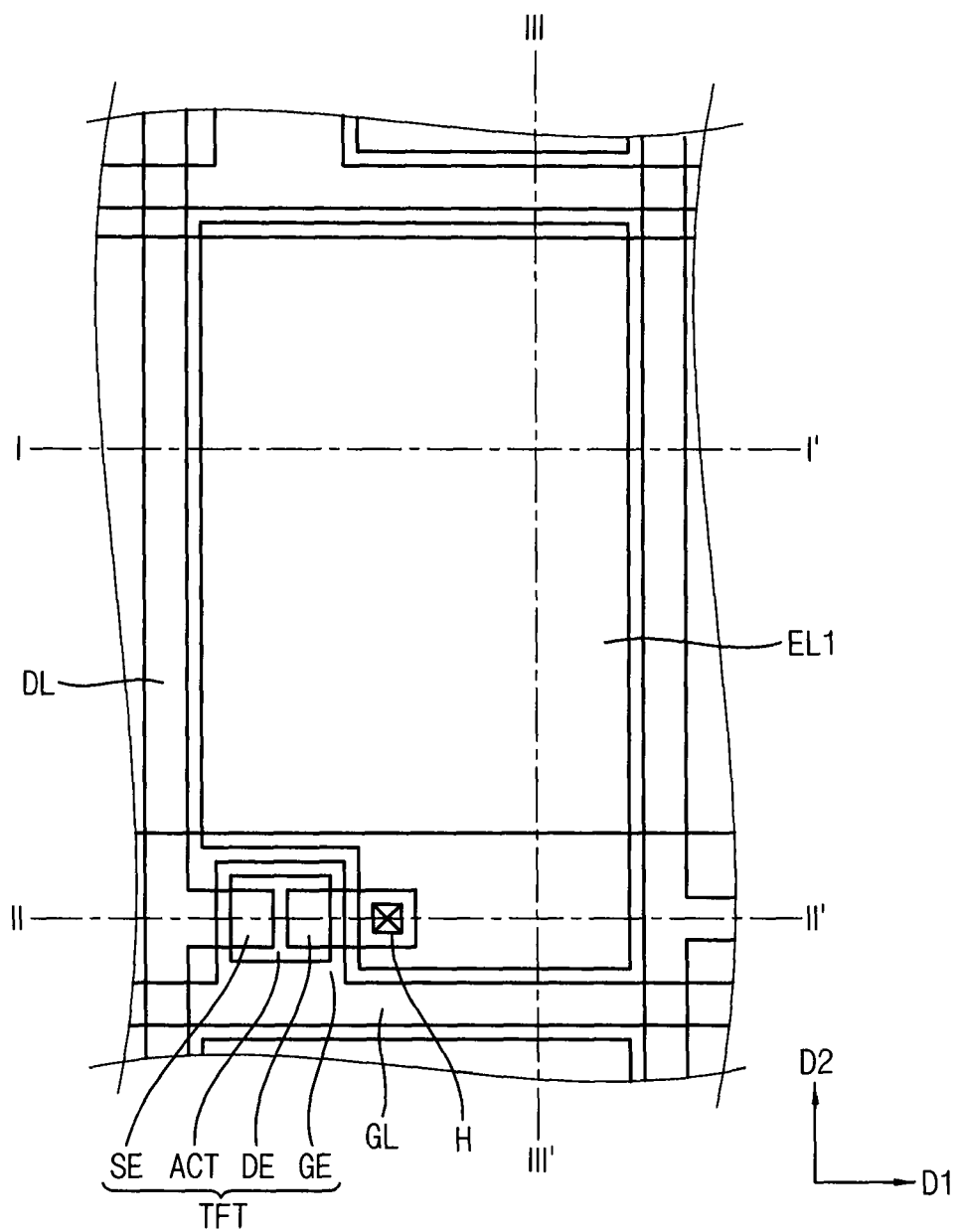

DISPLAY PANEL, DISPLAY APPARATUS INCLUDING THE SAME AND METHOD OF MANUFACTURING THE SAME

This application claims priority to Korean Patent Application No. 10-2014-0023009, filed on Feb. 27, 2014, and all the benefits accruing therefrom under 35 U.S.C. §119, the invention of which is incorporated by reference herein in its entirety.

BACKGROUND

1. Field

Exemplary embodiments of the invention relate to a display panel capable of effectively preventing damage to a display area.

In addition, exemplary embodiments of the invention relate to a method of manufacturing the display panel and a display apparatus including the display panel.

2. Description of the Related Art

Recently, a display apparatus having light weight and small size has been manufactured. A cathode ray tube ("CRT") display apparatus has been used due to a performance and a competitive price. However, the CRT display apparatus has a weakness with a size or portability. Therefore, a display apparatus such as a plasma display apparatus, a liquid crystal display ("LCD") apparatus and an organic light emitting display apparatus has been highly regarded due to small size, light weight and low-power-consumption.

The LCD apparatus applies a voltage to specific molecular arrangement configured to change the molecular arrangement. The LCD apparatus displays an image using changes of optical property (for example, birefringence, rotatory polarization, dichroism and light scattering) of a liquid crystal cell according to the changes of the molecular arrangement.

SUMMARY

Recently, a liquid crystal display panel using only one substrate. However, during a rework process of detaching and attaching a polarizer on opposite side of the substrate, or due to an external shock, damage to a display area may be caused.

One or more exemplary embodiment of the invention provides a display panel capable of effectively preventing damage to a display area.

One or more exemplary embodiments of the invention also provide a method of manufacturing the display panel.

One or more exemplary embodiments of the invention also provide a display apparatus having the display panel.

According to an exemplary embodiment of the invention, a display panel includes a base substrate, a gate line disposed under the base substrate and extending in a first direction, a data line disposed under the base substrate and extends in a second direction substantially perpendicular to the first direction, a thin film transistor disposed under the base substrate, and electrically connected to the gate line and the data line, a first electrode disposed under the base substrate and electrically connected to the thin film transistor, an image displaying portion disposed under the first electrode and overlapped with the first electrode, a protecting layer disposed under the image displaying portion, and an upper polarizer disposed on the base substrate and opposite to the thin film transistor with reference to the base substrate. The protecting layer surrounds a lower surface of the image displaying portion and both sides of the image displaying portion in the second direction, and includes a protrusion wall protruded in a direction opposite to the base substrate.

In an exemplary embodiment, the protrusion wall of the protecting layer may overlap the data line.

In an exemplary embodiment, the display panel may further include a sealing layer which is disposed under the protecting layer, and contacts with a side surface of the image displaying portion in the first direction.

In an exemplary embodiment, the protrusion wall of the protecting layer may be higher than the sealing layer with reference to the base substrate.

In an exemplary embodiment, the display panel may further include a lower polarizer which is disposed under the protecting layer and the sealing layer, and contacts the protrusion wall of the protecting layer In an exemplary embodiment, the protrusion wall may be protruded from the sealing layer by less than about 10 micrometers.

In an exemplary embodiment, the display panel may further include a second electrode disposed between the image displaying portion and the protecting layer.

In an exemplary embodiment, the display panel may further include a color filter disposed between the base substrate and the first electrode.

In an exemplary embodiment, the display panel may further include a black matrix which is disposed between the base substrate and the protecting layer, contacts the color filter, and is overlapped with the thin film transistor.

In an exemplary embodiment, the display panel may further include a color filter which is disposed under the protecting layer, and contacts a side of the protrusion wall of the protecting layer.

In an exemplary embodiment, the display panel may further include a black matrix which is disposed under the protecting layer, contacts the color filter, overlapped with the thin film transistor, and contacts a side surface of the image displaying portion in the first direction.

In an exemplary embodiment, the display panel may further include a first insulation layer disposed under the base substrate under which the gate line is disposed and between the gate line and the data line, a second insulation layer disposed under the first insulation layer under which the data line is disposed and between the data line and the first electrode, a third insulation layer disposed between the first electrode and the image displaying portion, and a fourth insulation layer disposed between the image displaying portion and the second electrode.

In an exemplary embodiment, the base substrate may include a glass substrate. An embossing pattern may be provided on a lower surface of the base substrate. The gate line may include a first gate layer disposed under the lower surface of the base substrate and a second gate layer disposed under the first gate layer. The first gate layer may include copper oxide, and the second gate layer includes copper. The first insulation layer may include silicon dioxide.

In an exemplary embodiment, an embossing pattern may be provided on a lower surface of the first insulation layer. The data line may include a first data layer disposed under the lower surface of the first insulation layer and a second data layer disposed under the first data layer. The first data layer may include copper oxide, and the second data layer includes copper. The second insulation layer may include silicon dioxide.

According to an exemplary embodiment of the invention, a display apparatus includes a display panel, an upper polarizer disposed on the display panel, a backlight assembly disposed under the display panel to provide light to the display panel, a lower polarizer disposed between the display panel and the backlight assembly, a receiving container which receives the display panel, the upper polarizer, the backlight assembly and the lower polarizer. The display panel includes a base substrate, a gate line disposed under the base substrate and extending in a first direction, a data line disposed under the base substrate and extends in a second direction substantially perpendicular to the first direction, a thin film transistor disposed under the base substrate, and electrically connected to the gate line and the data line, a first electrode disposed under the base substrate and electrically connected to the thin film transistor, an image displaying portion disposed under the first electrode and overlapped with the first electrode, and a protecting layer disposed under the image displaying portion and including a protrusion wall protruded in a direction opposite toward the base substrate. The protecting layer surrounds a lower surface of the image displaying portion and both sides of the image displaying portion in the second direction. The protrusion wall of the display panel contacts the lower polarizer. The lower polarizer contacts the backlight assembly. The backlight assembly contacts the receiving container.

In an exemplary embodiment, the receiving container may include a bottom plate and a side wall which extends from an edge of the bottom plate and is perpendicular to the bottom plate. The side wall may contact boundaries of a lower surface of the base substrate.

In an exemplary embodiment, the display apparatus may further include a buffer element disposed between the boundaries of the lower surface of the base substrate and the side wall of the receiving container, and including an elastic material.

According to an exemplary embodiment of the invention, a method of manufacturing a display panel includes providing a first electrode on a base substrate on which a thin film transistor is disposed, providing a sacrificial layer on the first electrode, providing a second electrode on the sacrificial layer, providing a protecting layer having a protrusion wall protruded along a direction opposite toward the base substrate on the second electrode, removing the sacrificial layer to define a tunnel-shaped cavity between the first electrode and the second electrode, providing an image displaying portion in the tunnel-shaped cavity, and attaching an upper polarizer on the base substrate opposite to the image displaying portion with reference to the base substrate.

In an exemplary embodiment, providing the protecting layer may include coating a photoresist having a photosensitive organic material on the second electrode, irradiating the photoresist using a mask having a blocking area, a half area and a transparent area, where the blocking area completely blocks light, the half area partially blocks light and the transparent area passes light, and developing the photoresist which is irradiated to form the protecting layer.

In an exemplary embodiment, the method may further include providing the thin film transistor. providing the thin film transistor may include providing an embossing pattern on the base substrate, providing a first layer including a metal oxide on the base substrate on which the embossing pattern is provided, providing a second layer including a metal on the first layer, providing a wiring by patterning the first and second layers, and providing a first insulation layer on the wiring.

According to the invention, an upper polarizer of a display panel is attached on a base substrate, and a lower polarizer contacts a protrusion wall of a protecting layer so that re-work for the upper and lower polarizer may be easy, and damage an image displaying portion of the display panel may be effectively prevented.

In addition, an external impact to the display panel may be dispersed so that the image displaying portion of the display panel may be protected.

BRIEF DESCRIPTION OF THE DRAWINGS

The above and other features of the invention will become more apparent by describing in detail exemplary embodiments thereof with reference to the accompanying drawings, in which:

FIG. 3 is a plan view illustrating an exemplary embodiment of a display panel according to the invention;

DETAILED DESCRIPTION

Figure 1:
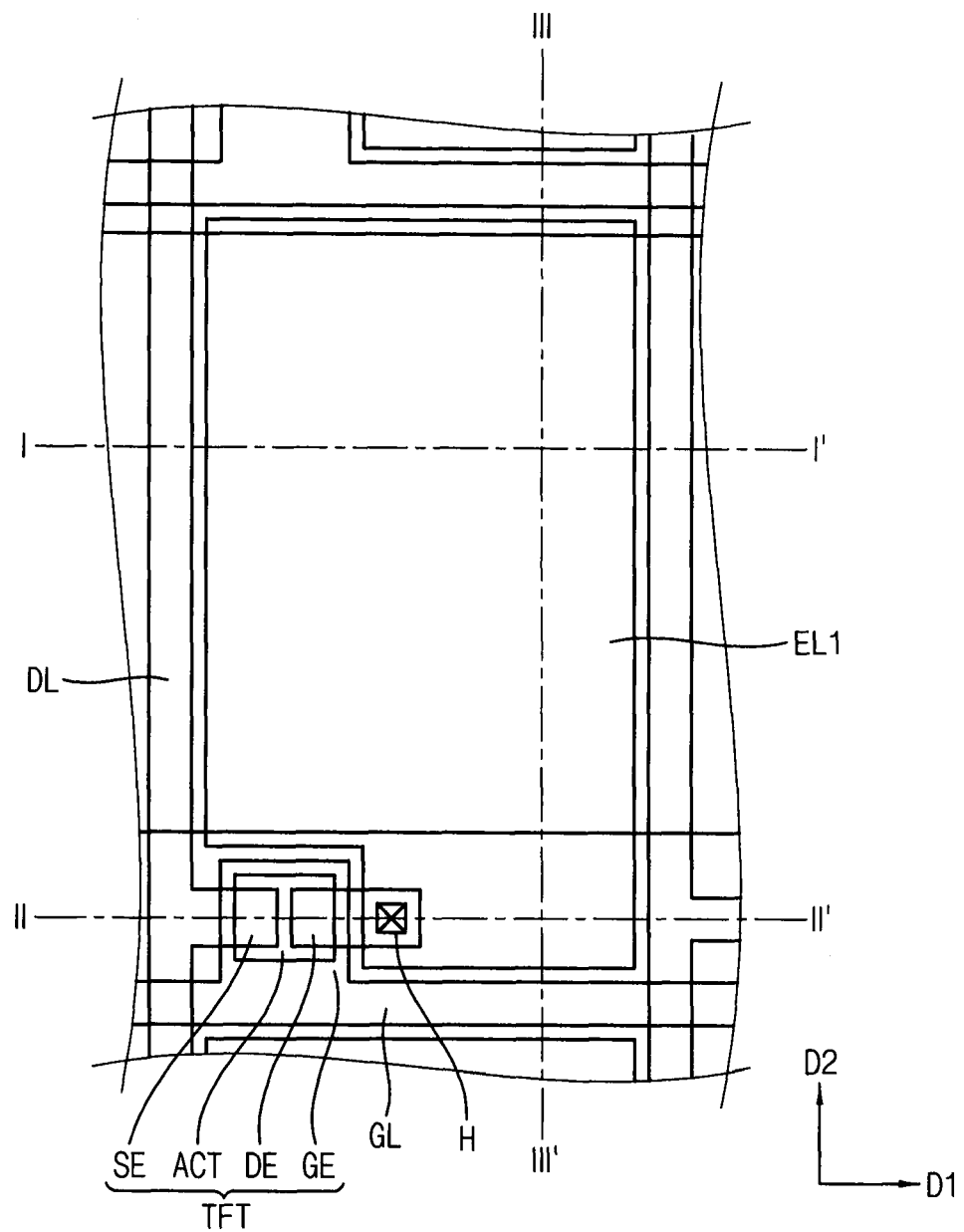
FIG. 1 is a plan view illustrating an exemplary embodiment of a display panel according to the invention.

Hereinafter, the invention will be explained in detail with reference to the accompanying drawings.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 2A:
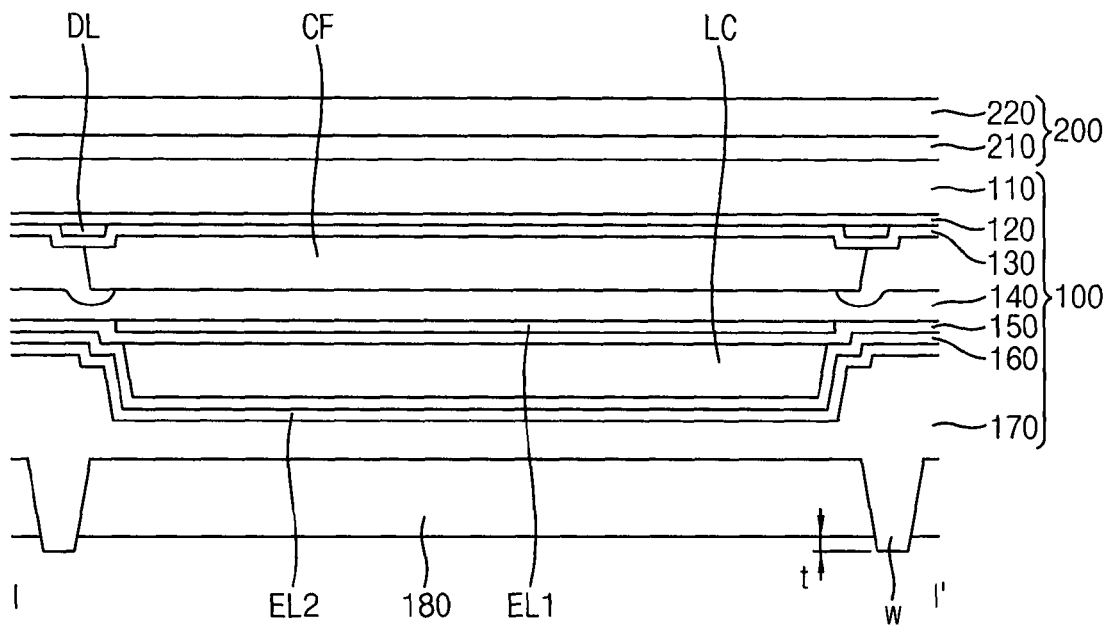
FIG. 2A is a cross-sectional view taken along line I-I' of FIG. 1.
Figure 2B:
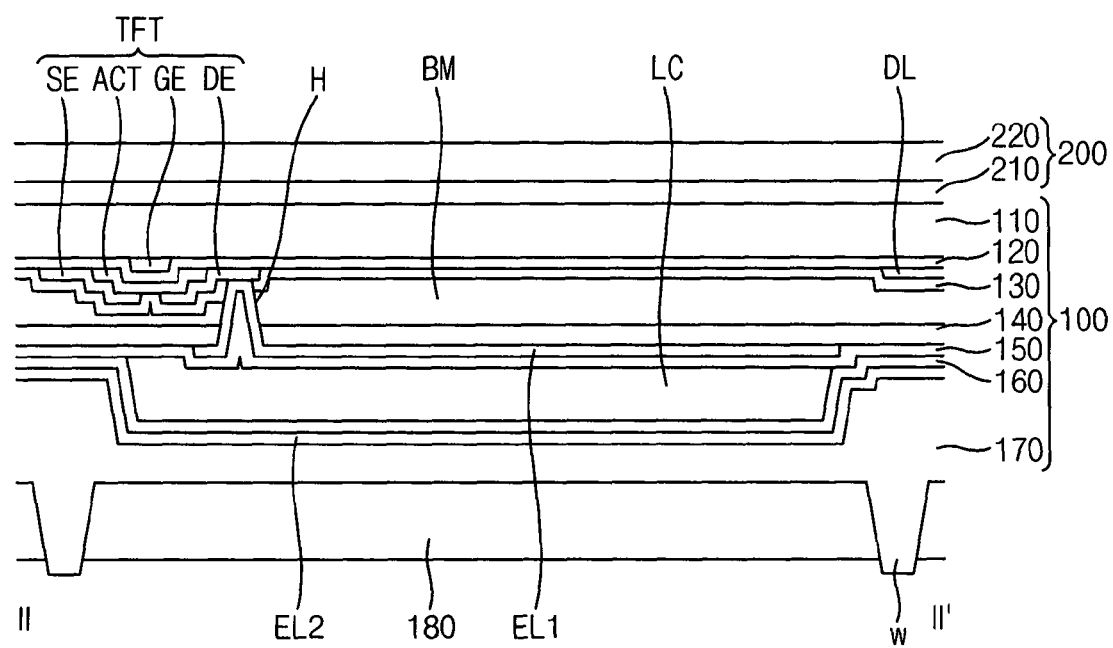
FIG. 2B is a cross-sectional view taken along line II-II' of FIG. 1.
Figure 2C:
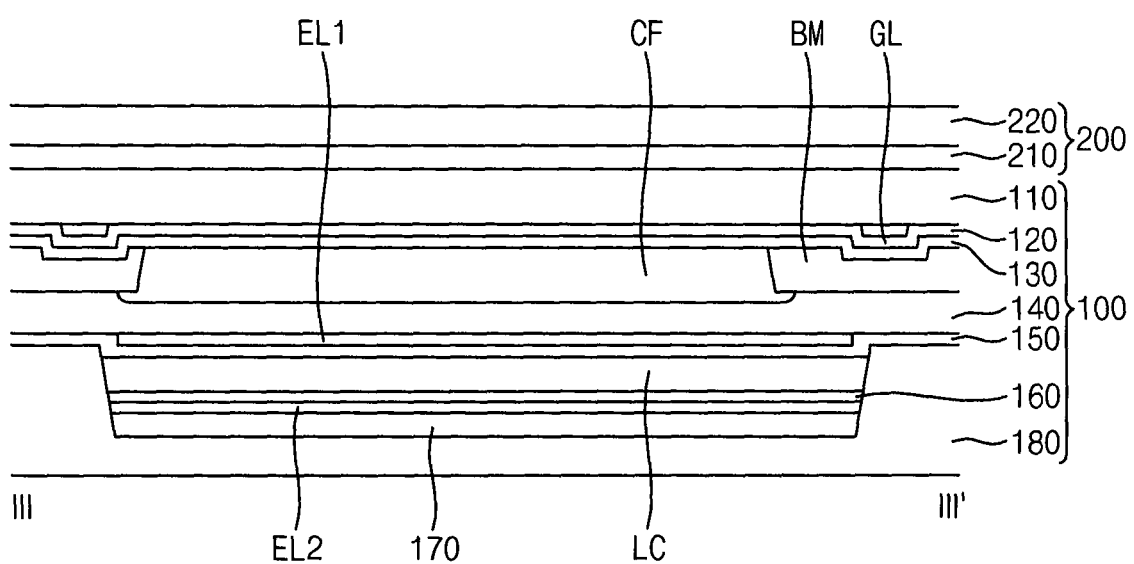
FIG. 2C is a cross-sectional view taken along line III-III' of FIG. 1.

FIG. 1 is a plan view illustrating a display panel according to an exemplary embodiment of the invention. FIG. 2A is a cross-sectional view taken along line I-I' of FIG. 1. FIG. 2B is a cross-sectional view taken along line II-II' of FIG. 1. FIG. 2C is a cross-sectional view taken along line III-III' of FIG. 1.

Referring to FIGS. 1 to 2C, a display panel 100 includes a base substrate 110, a gate line GL, a first insulation layer 120, a data line DL, a thin film transistor TFT, a second insulation layer 130, a color filter CF, a black matrix BM, an overcoating layer 140, a first electrode EL1, a third insulation layer 150, an image displaying portion LC, a fourth insulation layer 160, a second electrode EL2, a protecting layer 170 and a sealing layer 180.

Although only one pixel area is described in the figures, in an exemplary embodiment, the display panel 100 may include a large number of pixel areas displaying an image. In an exemplary embodiment, the pixel areas may be arrayed in a regular matrix structure having a plurality of rows and columns, for example. In an exemplary embodiment, the pixel areas may have same basic and repeated structures so that only one pixel area will be described herein as an example. However, the invention is not limited thereto, and the pixel area may have various modifications in size and/or shape and/or number of field altering slits or other fine features included therein. In exemplary embodiments, the pixel areas may have rectangular, V or Z shapes in a plan view.

The base substrate 110 may include an insulation substrate. In an exemplary embodiment, the base substrate 110 includes a flexible substrate. In an exemplary embodiment, the base substrate 110 may include a glass substrate, a quartz substrate, a transparent resin substrate, etc. In an exemplary embodiment, the transparent resin substrate for the base substrate 110 may include polyimide-based resin, acryl-based resin, polyacrylate-based resin, polycarbonate-based resin, polyether-based resin, sulfonic acid including resin, polyethyleneterephthalate-based resin, etc.

The gate line GL and the gate electrode GE are disposed under the base substrate 110. The gate line GL extends in a first direction D1. The gate electrode GE is electrically connected to the gate line GL. In an exemplary embodiment, the gate line GL and the gate electrode GE may include metal, alloy, conductive metal oxide, a transparent conductive material, etc. In an exemplary embodiment, the gate line GL and the gate electrode GE may include copper (Cu) and copper oxide (CuOx). In an exemplary embodiment, the gate line GL and the gate electrode GE may include gallium doped zinc oxide ("GZO"), indium doped zinc oxide ("IZO") or copper-manganese alloy (CuMn), for example.

The first insulation layer 120 is disposed under the base substrate 110, gate line GL and the gate electrode GE. In an exemplary embodiment, the first insulation layer 120 may include silicon oxide (SiOx) and silicon nitride (SiNx), for example.

An active pattern ACT is disposed under the first insulation layer 120. The active pattern ACT overlaps the gate electrode GE in a plan view. In an exemplary embodiment, the active pattern ACT may include a semiconductor layer including amorphous silicon (a-Si:H) and an ohmic contact layer including n+ amorphous silicon (n+ a-Si:H). In an exemplary embodiment, the active pattern ACT may include an oxide semiconductor, for example. In an exemplary embodiment, the oxide semiconductor may include an amorphous oxide including at least one of indium (In), zinc (Zn), gallium (Ga), tin (Sn) and hafnium (Hf), for example. In an exemplary embodiment, the oxide semiconductor may include an oxide such as InZnO, indium gallium oxide (InGaO), indium tin oxide (InSnO), zinc tin oxide (ZnSnO), gallium tin oxide (GaSnO) and gallium zinc oxide (GaZnO). In an exemplary embodiment, the active pattern ACT may include indium gallium zinc oxide ("IGZO"), for example.

The source electrode SE is disposed under the active pattern ACT, and electrically connected to the data line DL. The drain electrode DE is disposed under the active pattern ACT, and spaced apart from the source electrode SE.

The gate electrode GE, the active pattern ACT, the source electrode SE, and the drain electrode DE provide the thin film transistor TFT.

The data line DL is disposed under the first insulation layer 120, and extends in a second direction D2 which is substantially perpendicular to the first direction D1. The data line DL crosses the gate line GL. In an exemplary embodiment, the data line DL, the source electrode SE and the drain electrode DE may include metal, alloy, conductive metal oxide, a transparent conductive material, etc. In an exemplary embodiment, the data line DL, the source electrode SE and the drain electrode DE may include copper (Cu) and copper oxide (CuOx). In an exemplary embodiment, the data line DL, the source electrode SE and the drain electrode DE may include GZO, IZO or copper-manganese alloy (CuMn).

In an exemplary embodiment, the thin film transistor TFT, the gate line GL and the data line DL may include a metal oxide which has a relatively low surface reflectance. In an exemplary embodiment, the thin film transistor TFT, the gate line GL and the data line DL may include cupric oxide (CuO) or cuprous oxide (Cu$_2$O), for example. Thus, pattern stains due to the gate and data lines may be not be visible to users.

The second insulation layer 130 is disposed under the first insulation layer 120, the thin film transistor TFT and the data line DL. In an exemplary embodiment, the second insulation layer 130 may include inorganic insulating material, such as silicon nitride (SiNx), silicon oxide (SiOx) and etc.

The black matrix BM is disposed under the second insulation layer 130. The black matrix BM is disposed corresponding to an area except for the pixel area where an image is displayed, and blocks light. Thus, the black matrix BM may extend in the first direction D1 to overlap the thin film transistor TFT and the gate line GL. Although the black matrix BM overlaps with the thin film transistor TFT and the gate line GL in the exemplary embodiment, the black matrix BM may be disposed in a portion where the light should be blocked.

The color filter CF is disposed under the black matrix BM and the second insulation layer 130. The color filter CF supplies colors to the light passing through the image displaying portion LC. In an exemplary embodiment, the color filter CF may include a red color filter, a green color filter and blue color filter. The color filter CF corresponds to the pixel area. The color filters adjacent to each other may have different colors. The color filter CF may be overlapped with adjacent color filter CF in a boundary of the pixel area.

The over-coating layer 140 is disposed under the black matrix BM and the color filter CF. The over-coating layer 140 flattens and protects the color filters CF. In an exemplary embodiment, the over-coating layer 140 may include acrylic-epoxy material, for example.

The first electrode EL1 is disposed under the over-coating layer 140. The first electrode EL1 corresponds to the pixel area. A contact hole H is defined through the over-coating layer 140 and the black matrix BM to expose a portion of the drain electrode DE. The first electrode EL1 is electrically connected to the drain electrode DE through the contact hole H. In an exemplary embodiment, the first electrode EL1 may include a transparent conductive material, such as indium tin oxide ("ITO"), indium zinc oxide ("IZO") and etc. In an exemplary embodiment, the first electrode EL1 may include titanium (Ti) and/or molybdenum titanium (MoTi).

The third insulation layer 150 is disposed under the first electrode EL1 and the over-coating layer 140. In an exemplary embodiment, the third insulation layer 150 may include inorganic insulating material, such as silicon nitride (SiNx), silicon oxide (SiOx) and etc.

The image displaying portion LC is disposed under the third insulation layer 150. The image displaying portion LC is disposed corresponding to the pixel area and spaced apart from an adjacent image displaying portion of an adjacent pixel area. The image displaying portion LC may be a liquid crystal portion including liquid crystal molecules having optical anisotropy. The liquid crystal molecules are driven by electric field so that an image is displayed by passing or blocking light through the image displaying portion LC.

In an exemplary embodiment, the image displaying portion LC may be an electrophoresis portion including insulative medium and charge carriers. In an exemplary embodiment, the insulative medium may be dispersion medium of the dispersed charge carriers. The charge carriers have electrophoresis and are diffused in the insulative medium. The charge carriers move by the electric field so that an image is displayed by passing or blocking light through the image displaying portion LC.

The fourth insulation layer 160 is disposed under the image displaying portion LC and the third insulation layer 150. In an exemplary embodiment, the fourth insulation layer 160 may include inorganic insulating material, such as silicon nitride (SiNx), silicon oxide (SiOx) and etc.

Both ends of the image displaying portion LC in the second direction D2 are exposed by the fourth insulation layer 160 and directly makes contact with the sealing layer 180.

In an exemplary embodiment, an alignment layer (not shown) may be disposed between the third insulation layer 150 and the image displaying portion LC, and between the fourth insulation layer 160 and the image displaying portion LC. The alignment layer aligns the liquid crystal molecules of the image displaying portion LC. In an exemplary embodiment, the alignment layer may align a liquid crystal director to perpendicular to or in parallel with the surface of first and second electrodes. In an exemplary embodiment, when the liquid crystal director aligns in parallel with the surface of the electrodes, polarized ultraviolet ("UV") ray may be irradiated to determine an alignment direction of the liquid crystal director. However, the invention is not limited thereto, and the alignment layer may be omitted according to a type of the image displaying portion LC, or providing method of the first electrode EL1 and the second electrode EL2. In an exemplary embodiment, when the first electrode EL1 and the second electrode EL2 have a plurality of micro-grooves thereon so that initial alignment of the liquid crystal molecules without an additional alignment layer may be available, then the alignment layer may be omitted. In an exemplary embodiment, when reactive mesogen layer for initial alignment of the image displaying portion LC is provided, the alignment layer may be omitted.

The second electrode EL2 is disposed under the fourth insulation layer 160. The second electrode EL2 is disposed corresponding to the pixel area. In an exemplary embodiment, the second electrode EL2 may include a transparent conductive material, such as ITO, IZO and etc. In an exemplary embodiment, the second electrode EL2 may include titanium (Ti) and/or molybdenum titanium (MoTi).

The protecting layer 170 is disposed under the second electrode EL2. The protecting layer 170 maintains a shape of the image displaying portion LC. The protecting layer 170 surrounds a bottom surface of the image displaying portion LC and side surfaces of the image displaying portion LC in the second direction D2. In an exemplary embodiment, the protecting layer 170 may include transparent polymeric material. The protecting layer 170 includes a protrusion wall W protruded in a direction opposite to the base substrate 110.

The protrusion wall W extends in the second direction D2, and overlaps the data line DL. A cross-sectional view of the protecting layer 170 along the first direction D1 may have a substantially H shape so that strength of the protecting layer 170 may be substantially improved. Accordingly, the image displaying portion LC may be effectively protected.

The sealing layer 180 is disposed under the protecting layer 170. Both upper and lower sides in a plan view of the image displaying portion LC are not covered by the protecting layer 170. The sealing layer 180 covers the both upper and lower sides of the image displaying portion LC along the first direction D1 to effectively prevent the image displaying portion LC to be exposed. The sealing layer 180 makes contacts with the both upper and lower sides of the image displaying portion LC in the first direction D1.

In addition, the sealing layer 180 covers the protecting layer 170 to make a bottom surface of the display panel 100 substantially flat. The sealing layer 180 is disposed in a space defined by an upper surface of the protecting layer 170 and the protrusion walls W, and has a height lower than the protrusion walls W with reference to the base substrate 110. Thus, the protrusion walls W is higher than the sealing layer 180 by a first height t. The first height t may be less than about 10 micrometers (μm).

A lower polarizer 300 (refer to FIGS. 18 and 19) disposed under the display panel 100 may make contact with the protrusion wall W. Accordingly, the lower polarizer 300 may be fixed on the display panel 100 without an additional adhesive element. In an exemplary embodiment, the protrusion wall W is protruded from the sealing layer 180 by the first height t, the sealing layer 180 makes contact with the lower polarizer 300, and the protrusion wall W presses the lower polarizer 300 so that the lower polarizer may be fixed on the display panel 100.

The upper polarizer 200 is disposed on the base substrate 110 and opposite to the thin film transistor with reference to the base substrate 110.

The upper polarizer 200 includes an upper polarizing layer 220 and an attachable-detachable layer 210 disposed between the upper polarizing layer 220 and the base substrate 110.

The upper polarizing layer 220 changes a light through passing the upper polarizing layer 220 into a polarized light. Although not shown in figures, in an exemplary embodiment, the upper polarizing layer 220 may include a retardation layer retarding a phase of the light, a protecting film and etc. In an exemplary embodiment, the upper polarizing layer 220 may include polymer, such as polycarbonate, polystyrene, polyvinyl alcohol, poly methyl methacrylate, polypropylene, polyolefine, polyacrylate, polyamide and etc.

The attachable-detachable layer 220 is disposed between the base substrate 110 and the upper polarizing layer 220 so that the upper polarizing layer 220 is attached on the base substrate 110. Although defects may be caused while the upper polarizing layer 220 is attached on the base substrate 110, the upper polarizing layer 220 may be easily detached from the base substrate 110 for a reworking. The attachable-detachable layer 220 may include a pressure sensitive adhesive. Thus, the attachable-detachable layer 220 may have a film shape and may be attached on the base substrate 110 by pressing the attachable-detachable layer 220. In an exemplary embodiment, the pressure sensitive adhesive may include acrylic rubber adhesive having a reflective index about 1.46 to about 1.52, and may include a particulate such as zirconia to adjusting the reflective index.

Figure 4A:
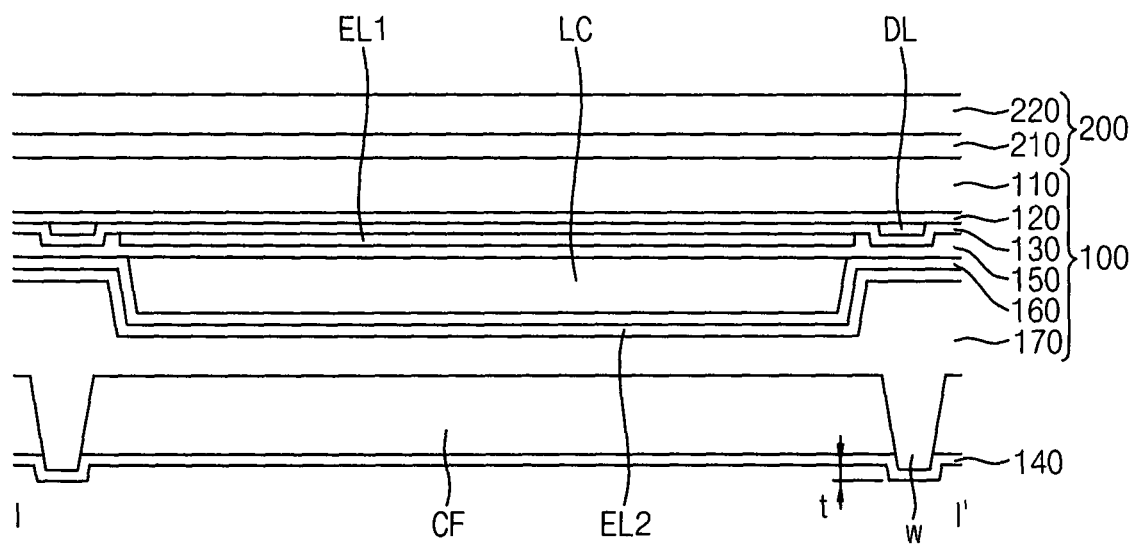
FIG. 4A is a cross-sectional view taken along line I-I' of FIG. 3.
Figure 4B:
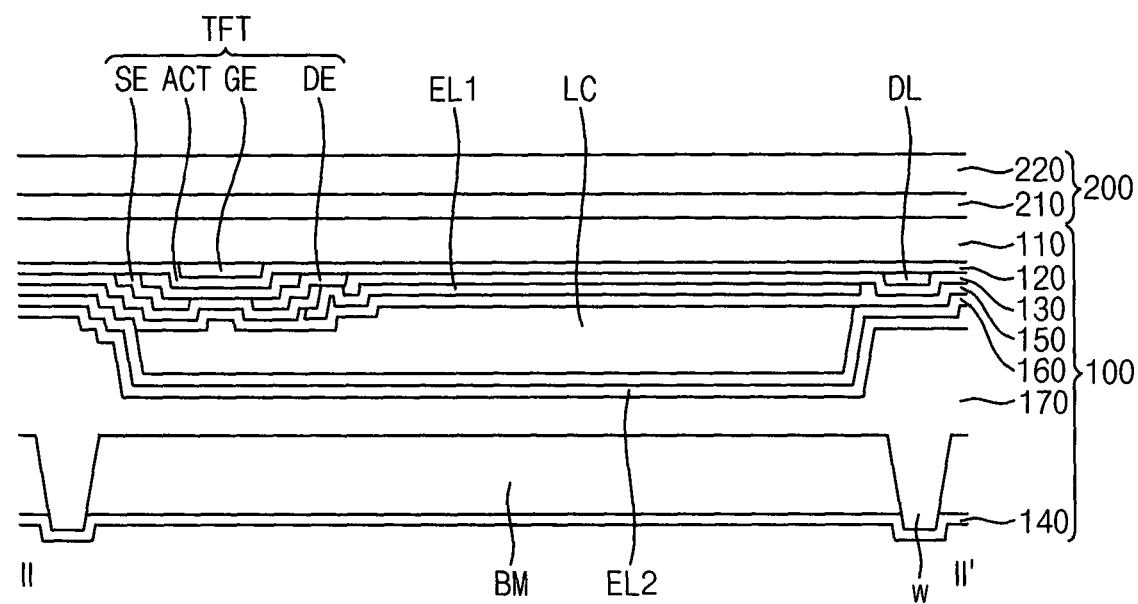
FIG. 4B is a cross-sectional view taken along line II-II' of FIG. 3.
Figure 4C:
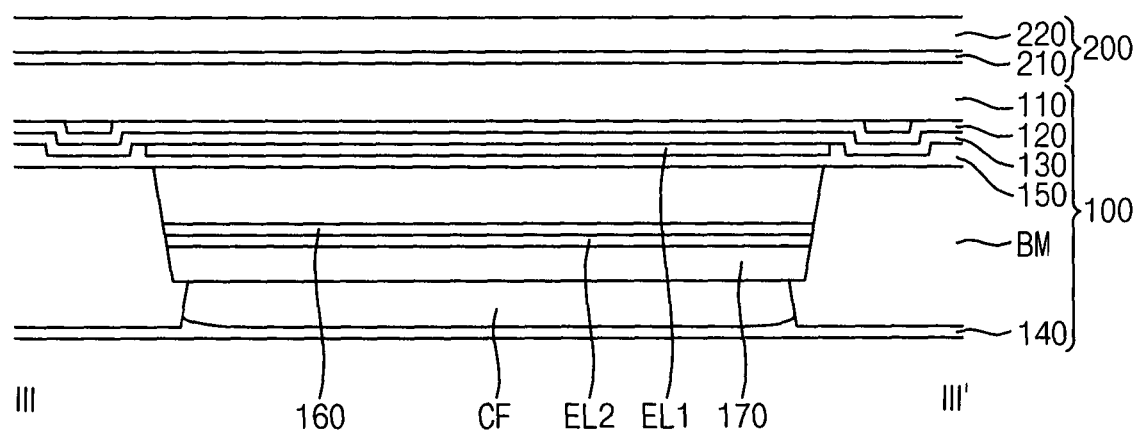
FIG. 4C is a cross-sectional view taken along line III-III' of FIG. 3.

FIG. 3 is a plan view illustrating a display panel according to an exemplary embodiment of the invention. FIG. 4A is a cross-sectional view taken along line I-I' of FIG. 3. FIG. 4B is a cross-sectional view taken along line II-II' of FIG. 3. FIG. 4C is a cross-sectional view taken along line III-III' of FIG. 3.

Referring to FIGS. 3 to 4C, a display panel 100 is substantially the same as a display panel 100 of FIG. 1, except for positions of color filter CF and black matrix BM. Thus, any further detailed descriptions concerning the same elements will be briefly described or be omitted.

The display panel 100 includes a base substrate 110, a gate line GL, a first insulation layer 120, a data line DL, a thin film transistor TFT, a second insulation layer 130, a first electrode EL1, a third insulation layer 150, an image displaying portion LC, a fourth insulation layer 160, a second electrode EL2, a protecting layer 170, a black matrix BM, a color filter CF, and an over-coating layer 140.

In an exemplary embodiment, the base substrate 110 may include an insulation substrate. The gate line GL and the gate electrode GE are disposed under the base substrate 110. The first insulation layer 120 is disposed under the base substrate 110, gate line GL and the gate electrode GE. An active pattern ACT is disposed under the first insulation layer 120. The source electrode SE is disposed under the active pattern ACT, and electrically connected to the data line DL. The drain electrode DE is disposed under the active pattern ACT. The gate electrode GE, the active pattern ACT, the source electrode SE, and the drain electrode DE provide the thin film transistor TFT.

The data line DL is disposed under the first insulation layer 120. The second insulation layer 130 is disposed under the first insulation layer 120, the thin film transistor TFT, and the data line DL.

The first electrode EL1 is disposed under the second insulation layer 130. The first electrode EL1 is disposed corresponding to the pixel area on which an image is displayed. A contact hole H is defined through the second insulation layer 130 to expose a portion of the drain electrode DE. The first electrode EL1 is electrically connected to the drain electrode DE through the contact hole H. In an exemplary embodiment, the first electrode EL1 may include a transparent conductive material, such as ITO, IZO and etc. In another exemplary embodiment, the first electrode EL1 may include titanium (Ti) and/or molybdenum titanium (MoTi).

The third insulation layer 150 is disposed under the first electrode EL1 and the third insulation layer 130. In an exemplary embodiment, the third insulation layer 150 may include inorganic insulating material, such as silicon nitride (SiNx), silicon oxide (SiOx) and etc.

The image displaying portion LC is disposed under the third insulation layer 150. The image displaying portion LC is disposed corresponding to the pixel area and spaced apart from an adjacent image displaying portion of an adjacent pixel area. In an exemplary embodiment, the image displaying portion LC may be a liquid crystal portion including liquid crystal molecules having optical anisotropy. The liquid crystal molecules are driven by electric field so that an image is displayed by passing or blocking light through the image displaying portion LC.

In an exemplary embodiment, the image displaying portion LC may be an electrophoresis portion including insulative medium and charge carriers. The insulative medium is dispersion medium of the dispersed charge carriers. The charge carriers have electrophoresis and are diffused in the insulative medium. The charge carriers move by the electric field so that an image is displayed by passing or blocking light through the image displaying portion LC.

The fourth insulation layer 160 is disposed under the image displaying portion LC and the third insulation layer 150. In an exemplary embodiment, the fourth insulation layer 160 may include inorganic insulating material, such as silicon nitride (SiNx), silicon oxide (SiOx) and etc.

Both ends of the image displaying portion LC in the second direction D2 are exposed by the fourth insulation layer 160 and directly makes contact with the black matrix BM.

In an exemplary embodiment, an alignment layer (not shown) may be disposed between the third insulation layer 150 and the image displaying portion LC, and between the fourth insulation layer 160 and the image displaying portion LC. The alignment layer aligns the liquid crystal molecules of the image displaying portion LC. In an exemplary embodiment, the alignment layer may align a liquid crystal director to perpendicular to or in parallel with the surface of first and second electrodes. In an exemplary embodiment, when the liquid crystal director aligns in parallel with the surface of the electrodes, polarized UV ray may be irradiated to determine an alignment direction of the liquid crystal director. However, the invention is not limited thereto, and the alignment layer may be omitted according to a type of the image displaying portion LC, or providing method of the first electrode EL1 and the second electrode EL2. In an exemplary embodiment, when the first electrode EL1 and the second electrode EL2 have a plurality of micro-grooves thereon so that initial alignment of the liquid crystal molecules without an additional alignment layer may be available, then the alignment layer may be omitted. In an exemplary embodiment, when reactive mesogen layer for initial alignment of the image displaying portion LC is provided, the alignment layer may be omitted.

The second electrode EL2 is disposed under the fourth insulation layer 160. The second electrode EL2 is disposed corresponding to the pixel area. In an exemplary embodiment, the second electrode EL2 may include a transparent conductive material, such as ITO, IZO and etc. In an exemplary embodiment, the second electrode EL2 may include titanium (Ti) and/or molybdenum titanium (MoTi).

The protecting layer 170 is disposed under the second electrode EL2. The protecting layer 170 maintains a shape of the image displaying portion LC. The protecting layer 170 surrounds a bottom surface of the image displaying portion LC and side surfaces of the image displaying portion LC in the second direction D2. In an exemplary embodiment, the protecting layer 170 may include transparent polymeric material. The protecting layer 170 includes a protrusion wall W protruded in a direction opposite to the base substrate 110.

The protrusion wall W extends in the second direction D2, and overlaps the data line DL. A cross-sectional view of the protecting layer 170 along the first direction D1 may have a substantially H shape so that strength of the protecting layer 170 may be substantially improved. Accordingly, the image displaying portion LC may be effectively protected.

The black matrix BM is disposed under the protecting layer 170 and the third insulation layer 150. The black matrix BM is disposed corresponding to an area except for the pixel area where the image is displayed, and blocks light. Thus, the black matrix BM may extend in the first direction D1 to overlap the thin film transistor TFT and the gate line GL. Although the black matrix BM overlaps with the thin film transistor TFT and the gate line GL in the exemplary embodiment, the black matrix BM may be disposed where the light should be blocked.

The color filter CF is disposed under the protecting layer 170 and the black matrix BM. The color filter CF supplies colors to the light passing through the image displaying portion LC. In an exemplary embodiment, the color filter CF may include a red color filter, a green color filter and blue color filter, for example. However, the invention is not limited thereto, and the color filter CF may include various other colors. The color filter CF corresponds to the pixel area. The color filters adjacent to each other may have different colors. The color filter CF is disposed in a space defined by the protecting layer 170, the protrusion wall W and the black matrix BM, and has height lower than the protrusion wall W with reference to the base substrate 110.

The over-coating layer 140 is disposed under the black matrix BM, the color filter CF, and the protrusion wall W of the protecting layer 170. The over-coating layer 140 substantially flattens and protects the color filters CF and the black matrix BM. In an exemplary embodiment, the over-coating layer 140 may include acrylic-epoxy material, for example. A portion of the over-coating layer 140 corresponding to the protrusion wall W is higher than a portion of the over-coating layer 140 corresponding to the color filter CF or the black matrix BM with reference to the base substrate 110. Thus, the portion of the over-coating layer 140 corresponding to the protrusion wall W is protruded from the other portion of the over-coating layer 140 by a first height t. In an exemplary embodiment, the first height t may be less than about 10 µm.

A lower polarizer 300 (refer to FIGS. 18 and 19) disposed under the display panel 100 may make contact with the portion of the over-coating layer 140 corresponding to the protrusion wall W. Accordingly, the lower polarizer may be fixed on the display panel 100 without an additional adhesive element. In an exemplary embodiment, the portion of the over-coating layer 140 corresponding to the protrusion wall W is protruded from the other portion of the over-coating layer 140 by the first height t, the over-coating layer 140 makes contact with the lower polarizer, and the portion of the over-coating layer 140 presses the lower polarizer so that the lower polarizer may be fixed on the display panel 100.

The upper polarizer 200 is disposed on the base substrate 110 and opposite to the thin film transistor with reference to the base substrate 110.

The upper polarizer 200 includes an upper polarizing layer 220 and an attachable-detachable layer 210 disposed between the upper polarizing layer 220 and the base substrate 110.

Figure 5:
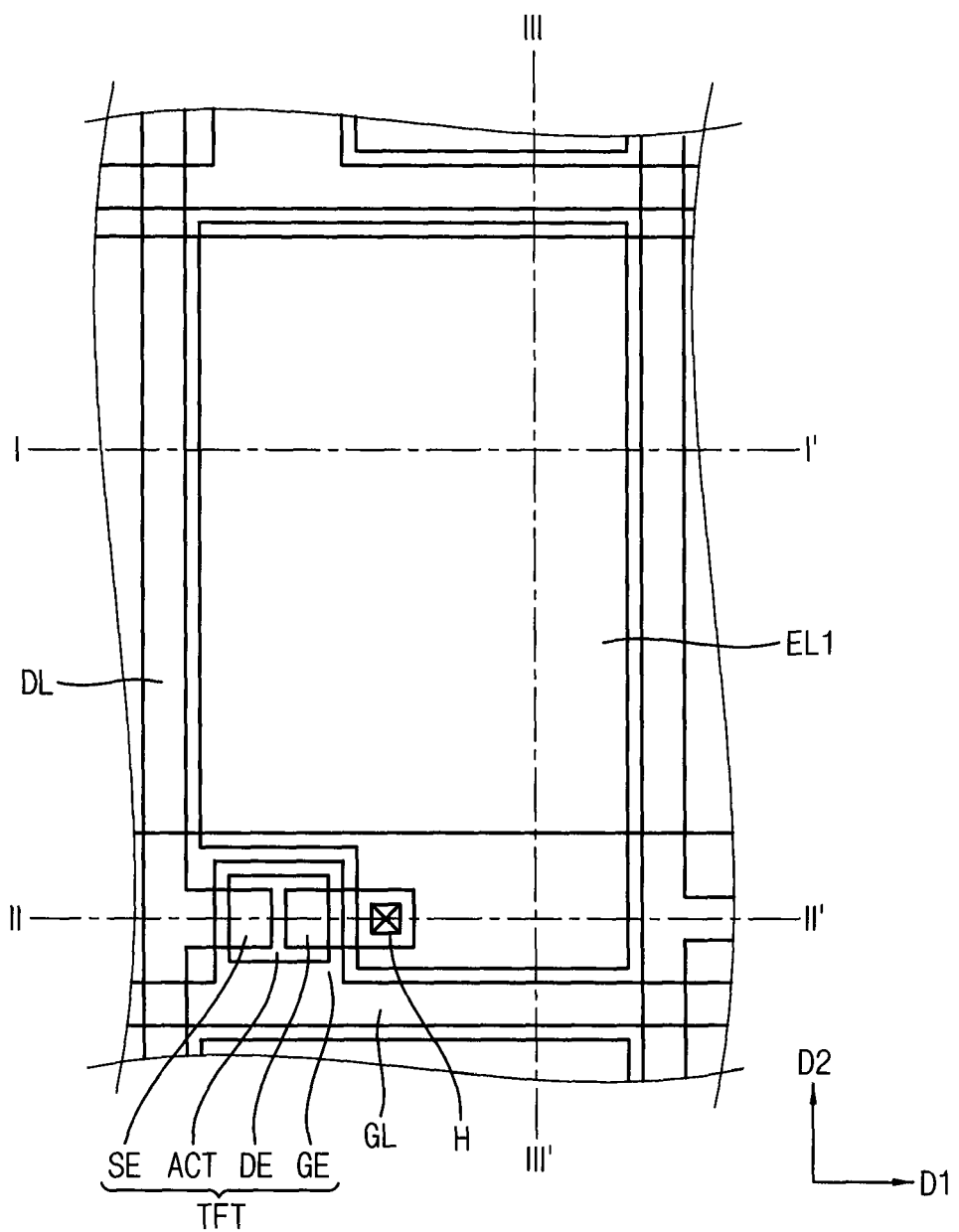
FIG. 5 is a plan view illustrating an exemplary embodiment of a display panel according to the invention.
Figure 6A:
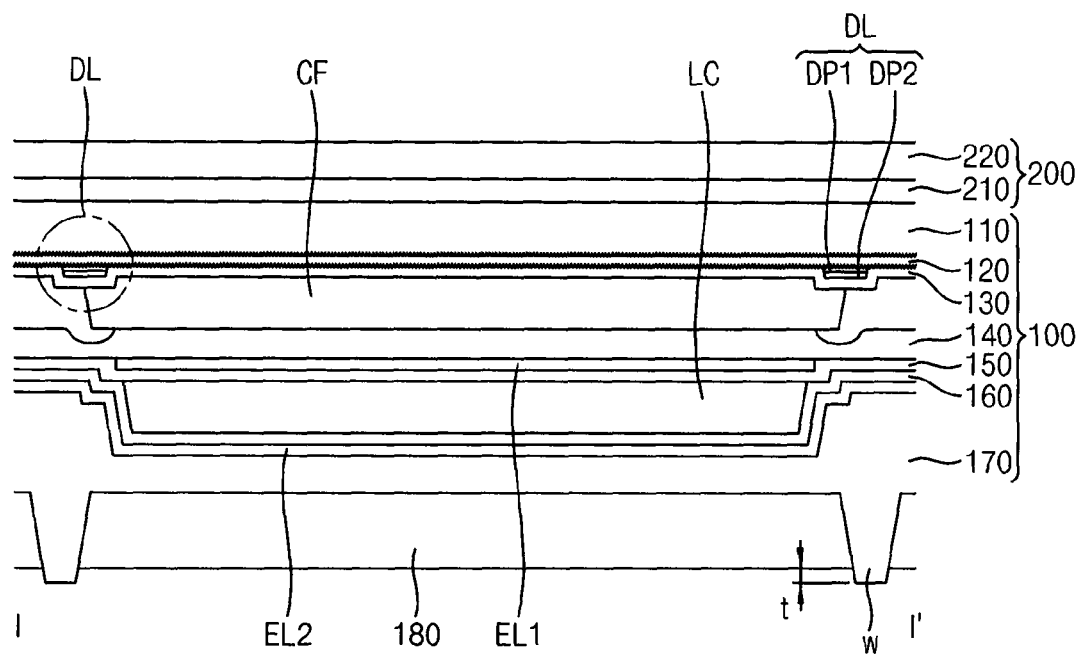
FIG. 6A is a cross-sectional view taken along line I-I' of FIG. 5.
Figure 6B:
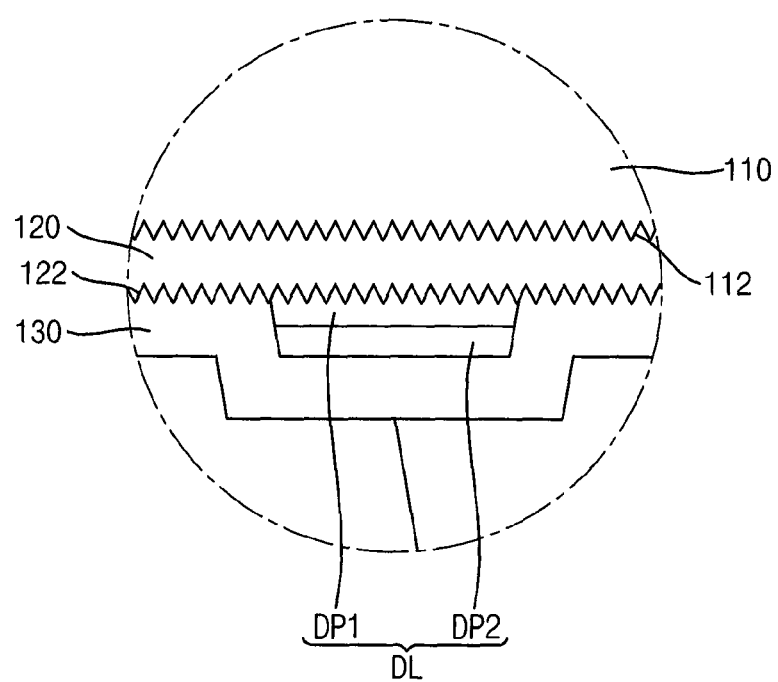
FIG. 6B is an enlarged cross-sectional view illustrating a data line of FIG. 6A.
Figure 7A:
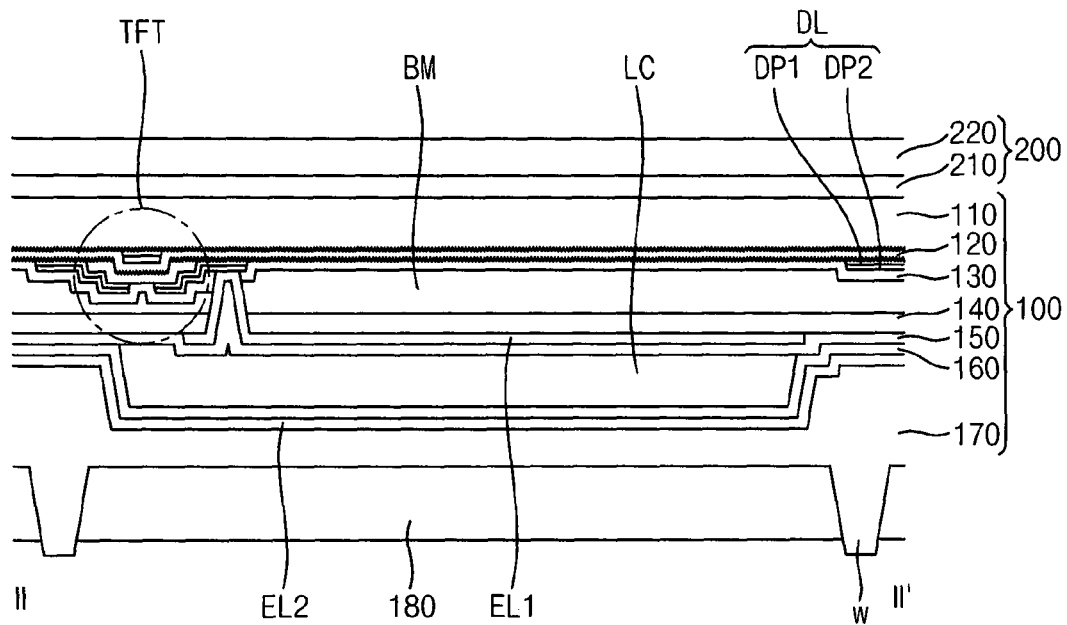
FIG. 7A is a cross-sectional view taken along line II-II' of FIG. 5.
Figure 7B:
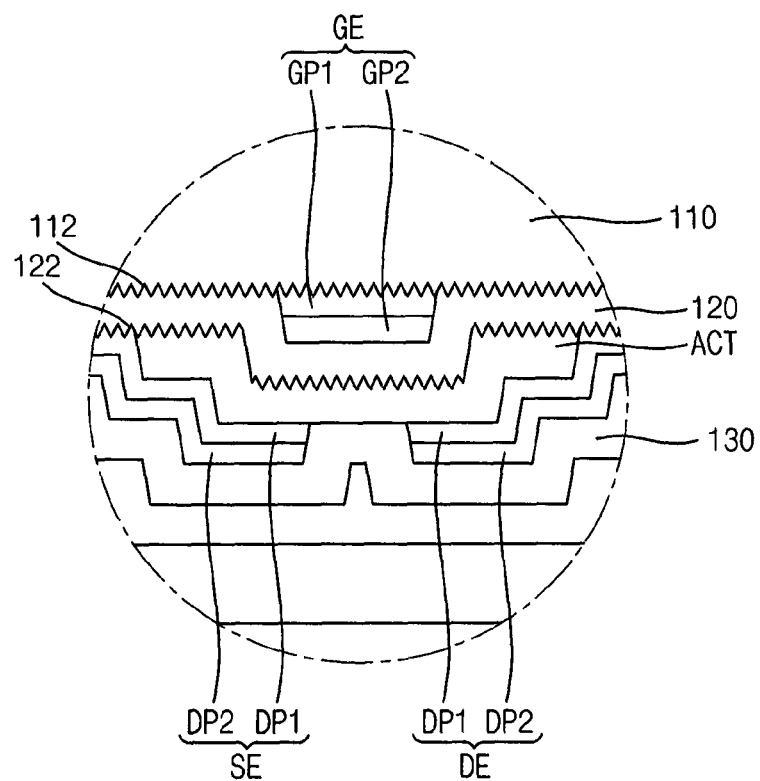
FIG. 7B is an enlarged cross-sectional view illustrating a thin film transistor of FIG. 7A.
Figure 8A:
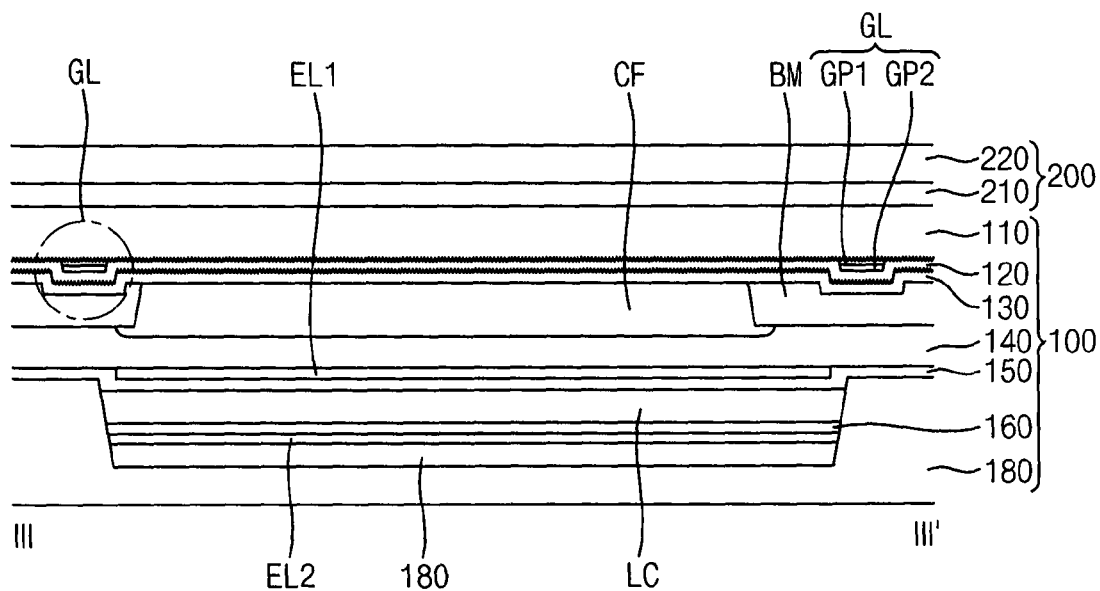
FIG. 8A is a cross-sectional view taken along line III-III' of FIG. 5.
Figure 8B:
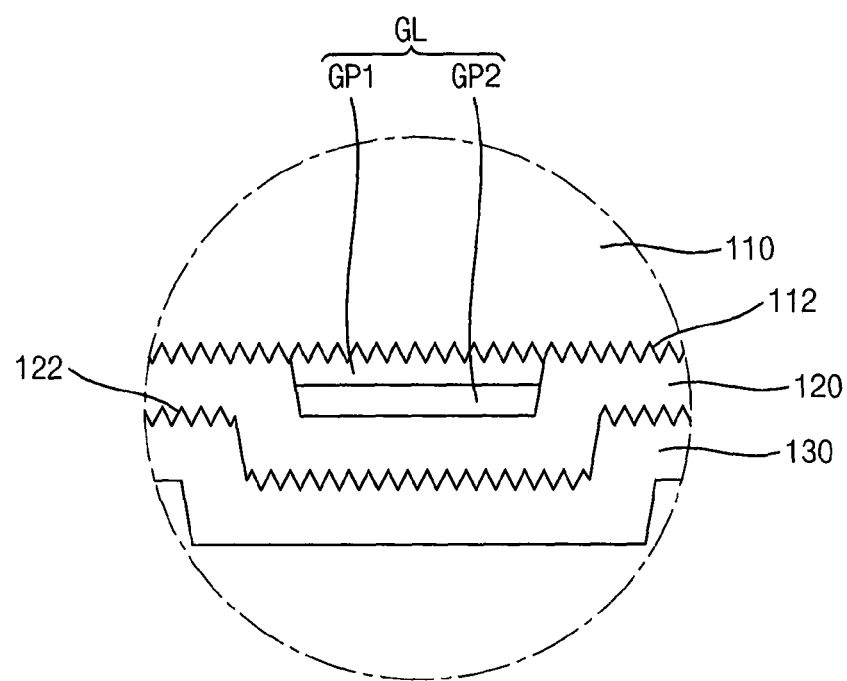
FIG. 8B is an enlarged cross-sectional view illustrating a gate line of FIG. 7A.

FIG. 5 is a plan view illustrating a display panel according to an exemplary embodiment of the invention. FIG. 6A is a cross-sectional view taken along line I-I' of FIG. 5. FIG. 6B is an enlarged cross-sectional view illustrating a data line of FIG. 6A. FIG. 7A is a cross-sectional view taken along line II-II' of FIG. 5. FIG. 7B is an enlarged cross-sectional view illustrating a thin film transistor of FIG. 7A. FIG. 8A is a cross-sectional view taken along line III-III' of FIG. 5. FIG. 8B is an enlarged cross-sectional view illustrating a gate line of FIG. 7A.

Referring to FIGS. 5 to 8B, a display panel 100 is substantially the same as a display panel 100 of FIGS. 1 to 2C, except for embossed lower surfaces of the base substrate 110 and the first insulation layer 120, gate and data patterns which are provided in dual layer. Thus, any further detailed descriptions concerning the same elements will be briefly described or be omitted.

In an exemplary embodiment, the base substrate 110 may include an insulation substrate. An embossing pattern is provided on a lower surface 112 of the base substrate 110. The embossing pattern may reduce reflectance of the gate pattern. Thus, reflected light which passes through the base substrate 110 and is reflected on the gate pattern may be substantially reduced by the embossing pattern. In an exemplary embodiment, the embossing pattern may be provided by haze treatment on the lower surface 112 of the base substrate 110, for example.

The gate pattern GL and GE includes a first gate layer GP1 and a second gate layer GP2 (refer to FIG. 7B). The first gate layer GP1 is disposed under the lower surface 112 of the base substrate 110. The first gate layer GP1 may include a material which has relatively low reflectance. In an exemplary embodiment, the first gate layer GP1 may include copper oxide such as cupric oxide (CuO) or cuprous oxide ($Cu_2O$), for example. The second gate layer GP2 is disposed under the first gate layer GP1. In an exemplary embodiment, the second gate layer GP2 may include a material which has relatively high electric conductivity. In an exemplary embodiment, the second gate layer GP2 may include copper, for example.

Accordingly, the reflected light passing through the base substrate 110 and reflected on the first gate layer GP1 of the gate pattern may be substantially reduced.

The first insulation layer 120 is disposed under the lower surface 112 of the base substrate 110 under which the gate line GL and the gate electrode GE are disposed. In an exemplary embodiment, the first insulation layer 120 may include a material which has a refractive index similar to that of the base substrate 110. In an exemplary embodiment, when the base substrate 110, the first insulation layer 120 may include silicon dioxide SiO2, for example.

Accordingly, unexpected light reflection and scattering on lower surface 112 of the base substrate 110 may be substantially reduced by the embossing pattern provided on the lower surface 112 of the base substrate 110 in a pixel area on which an image is displayed. Thus, reflective index of the gate pattern is substantially reduced by the embossing pattern provided on the lower surface 112 of the base substrate 110 so that line stains visible to users may be substantially reduced. In an exemplary embodiment, light reflection and scattering caused by the embossing pattern may be substantially reduced by choosing a material of the first insulation layer 120 having a refractive index similar to that of the base substrate 110.

In an exemplary embodiment, adhesion between the gate pattern and the base substrate 110 may be substantially improved by the embossing pattern.

An embossing pattern is provided on a lower surface 122 of the first insulation layer 120. The embossing pattern may reduce the reflective index of the data patter. Thus, reflected light passing through the first insulation layer and reflected on the data pattern may be substantially reduced by the embossing pattern. In an exemplary embodiment, the embossing pattern may be provided by haze treatment on the lower surface 122 of the first insulation layer 120, for example.

An active pattern ACT and the data pattern are disposed under the lower surface 122 of the first insulation layer 120 on which the embossing pattern is provided. The data pattern includes a data line DL, a source electrode SE and a drain electrode DE.

The data pattern DL, SE and DE includes a first data layer DP1 and a second data layer DP2. The first data layer DP1 is disposed under the lower surface 122 of the first insulation layer 120. The first data layer DP1 may include a material which has relatively low reflectance. In an exemplary embodiment, the first data layer DP1 may include copper oxide such as cupric oxide (CuO) or cuprous oxide ($Cu_2O$), for example. The second data layer DP2 is disposed under the first data layer DP1. The second data layer DP2 may include a material which has relatively high electric conductivity. In an exemplary embodiment, the second data layer DP2 may include copper, for example.

Accordingly, the reflected light passing through the first insulation layer 120 and reflected on the first data layer DP1 of the data pattern may be substantially reduced.

The second insulation layer 130 is disposed under the lower surface 122 of the first insulation layer 120 on which the active pattern ACT, the data line DL, the source electrode SE and the drain electrode DE. The second insulation layer 130 may include a material which has a refractive index similar to that of the first insulation layer 120. In an exemplary embodiment, the second insulation layer 130 may include silicon dioxide SiO2 like the first insulation layer 120.

Accordingly, unexpected light reflection and scattering on lower surface 122 of the first insulation layer 120 may be substantially reduced by the embossing pattern disposed under the lower surface 122 of the first insulation layer 120 in a pixel area on which an image is displayed. Thus, reflective index of the data pattern is substantially reduced by the embossing pattern disposed under the lower surface 122 of the first insulation layer 120 so that line stains visible to users may be substantially reduced. In an exemplary embodiment, light reflection and scattering caused by the embossing pattern may be substantially reduced by choosing a material of the second insulation layer 130 having a refractive index substantially the same as that of the first insulation layer 120.

In addition, adhesion between the data pattern and the first insulation layer 120 may be substantially improved by the embossing pattern.

FIGS. 9A to 17C are cross-sectional views illustrating a method of manufacturing a display panel of FIG. 5.

Figure 9A:
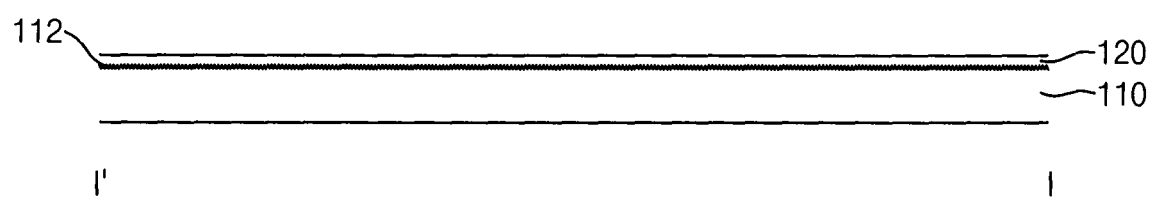
FIGS. 9A to 17C are cross-sectional views illustrating a method of manufacturing a display panel of FIG. 5.
Figure 9B:
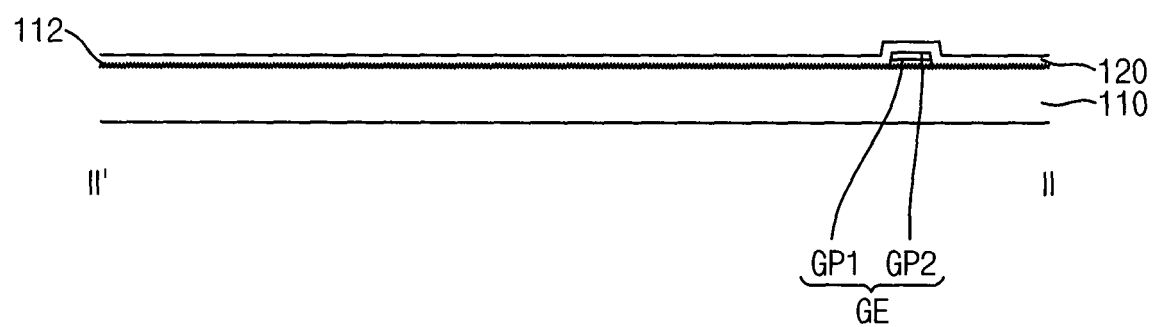
Figure 9C:
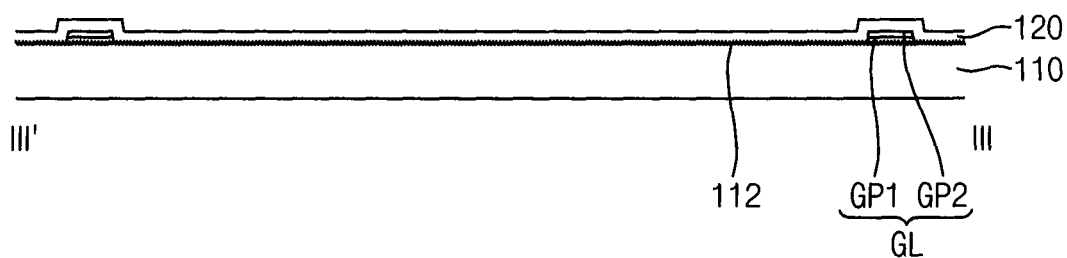

Referring to FIG. 9A to 9C, a gate electrode GE and a gate line GL are disposed on a base substrate 110. The gate electrode GE and the gate line GL may be provided by providing an embossing pattern on a lower surface 112 of the base substrate 110, providing a conductive layer on the lower surface 112 of the base substrate 110 on which the embossing pattern is provided, and patterning the conductive layer by photolithography.

In an exemplary embodiment, the embossing pattern is provided by haze treatment of a lower surface 112 of the base substrate 110, for example. After that, a first conductive layer and a second conductive layer are disposed on the lower surface 112 of the base substrate 110. In an exemplary embodiment, the first conductive layer may include copper oxide such as cupric oxide (CuO) or cuprous oxide ($Cu_2O$), for example. In an exemplary embodiment, the second conductive layer may include copper, for example. After that, the gate electrode GE and the gate line GL may be provided by patterning the first and second conductive layers by photolithography, for example.

A first insulation layer 120 is disposed on the base substrate 110 on which the gate electrode GE and the gate line GL are disposed. The first insulation layer 120 covers the gate electrode GE and the gate line GL to insulate the gate electrode GE and the gate line GL.

In an exemplary embodiment, The first insulation layer 120 may be obtained by a chemical vapor deposition ("CVD") process, a spin coating process, a plasma-enhanced chemical vapor deposition ("PECVD") process, a sputtering process, a vacuum evaporation process, a high-density plasma chemical vapor deposition ("HDP-CVD") process, a printing process or etc.

Figure 10A:
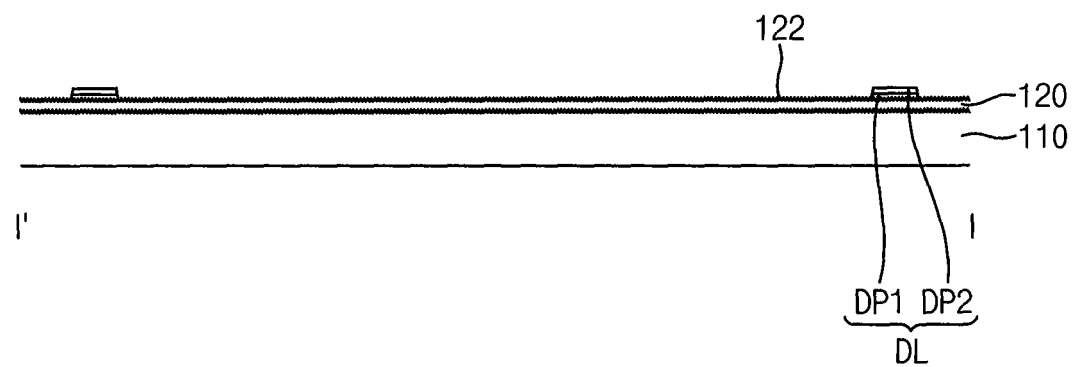
Figure 10B:
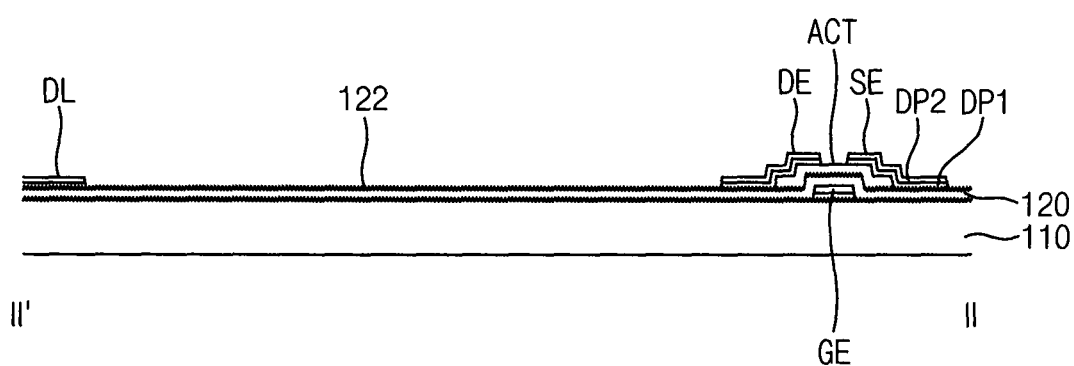
Figure 10C:
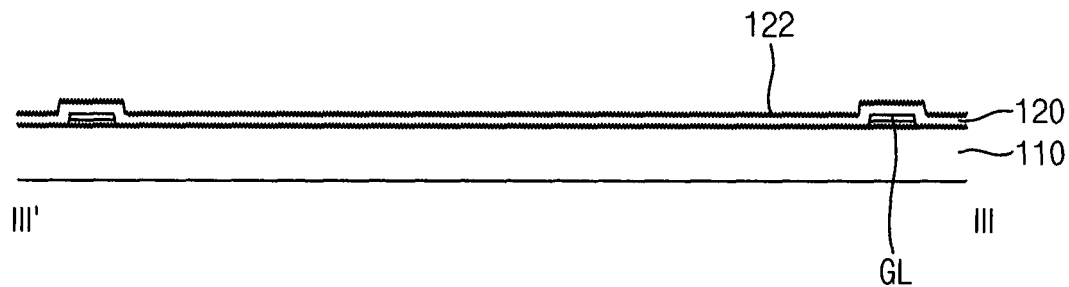

Referring to FIGS. 10A to 10C, an active pattern ACT, a data line DL, a source electrode SE and a drain electrode DE are disposed on the first insulation layer 120. The active pattern ACT, the data line DL, the source electrode SE and the drain electrode DE may be provided by providing an embossing pattern on an upper surface 122 (refer to FIG. 6B) of the first insulation layer 120, providing an active layer and a conductive layer on the upper surface 122 of the first insulation layer 120 on which the embossing pattern is provided, and by patterning the active layer and the conductive layer by photolithography, for example.

In an exemplary embodiment, the embossing pattern is provided by haze treatment of an upper surface 122 of the first insulation layer 120, for example. After that, an active layer is disposed on the upper surface 122 of the first insulation layer 120, and the active layer is patterned in to the active pattern ACT by photolithography, for example. After that, a first conductive layer and a second conductive layer are disposed on the upper surface 122 of the first insulation layer 120 on which the embossing pattern is provided. In an exemplary embodiment, the first conductive layer may include copper oxide such as cupric oxide (CuO) or cuprous oxide ($Cu_2O$), for example. In an exemplary embodiment, the second conductive layer may include copper, for example. After that, the data line DL, the source electrode SE and the drain electrode DE may be provided by patterning the first and second conductive layers by photolithography.

Figure 11A:
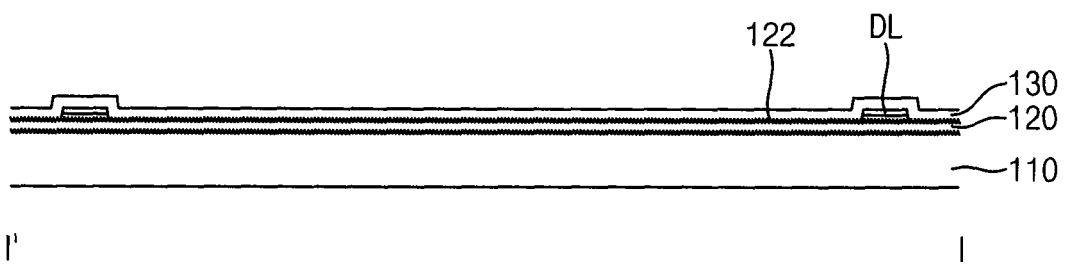
Figure 11B:
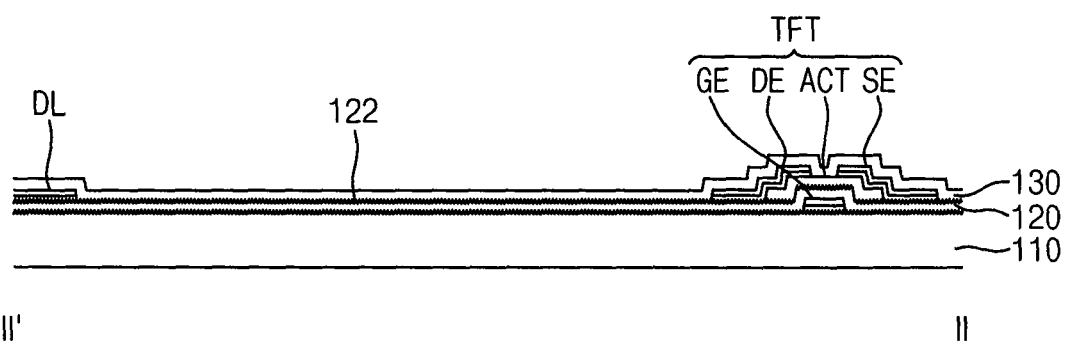
Figure 11C:
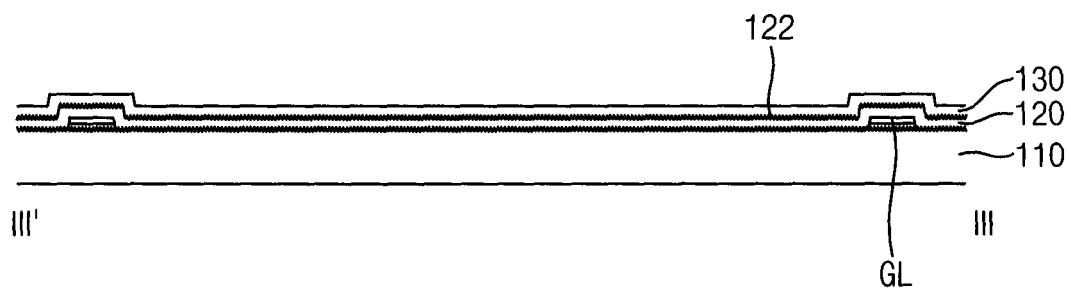

Referring to FIGS. 11A to 11C, a second insulation layer 130 is disposed on the first insulation layer 120 on which the active pattern ACT, the data line DL, the source electrode SE and the drain electrode DE are disposed. The second insulation layer 130 covers and insulates the ACT, the data line DL, the source electrode SE and the drain electrode DE.

In an exemplary embodiment, the second insulation layer 130 may be obtained by a CVD process, a spin coating process, a PECVD process, a sputtering process, a vacuum evaporation process, an HDP-CVD process, a printing process or etc.

Figure 12A:
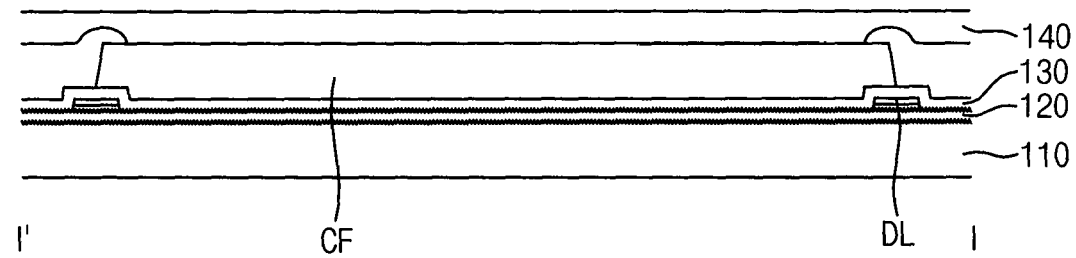
Figure 12B:
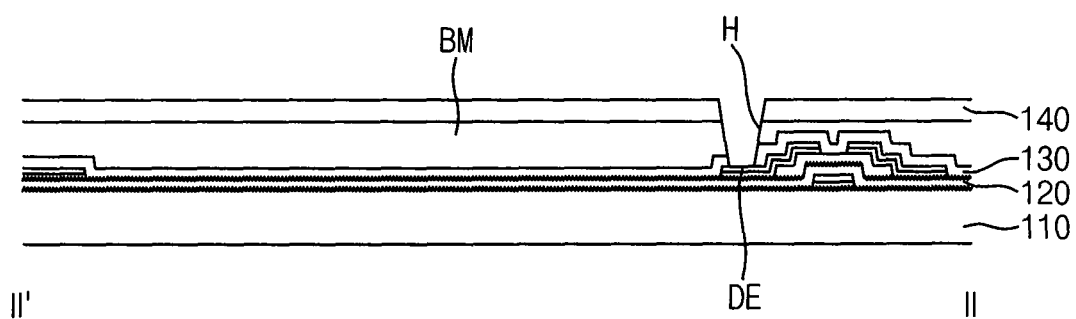
Figure 12C:
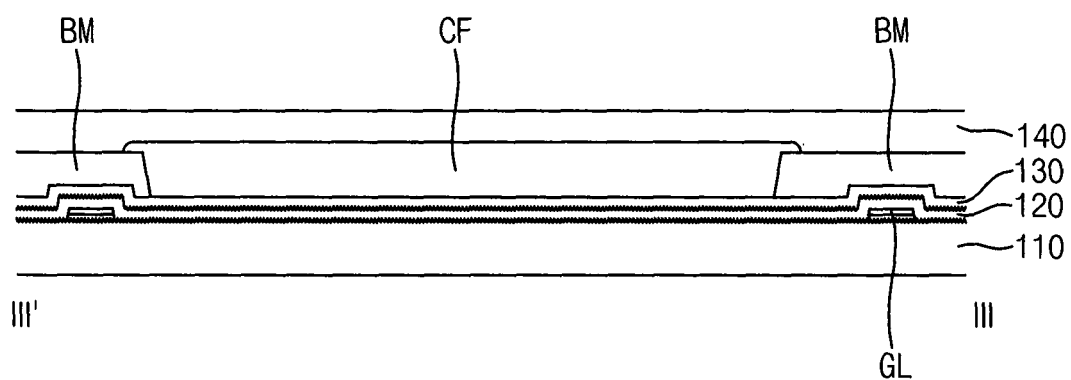

Referring to FIGS. 12A to 12C, a black matrix BM, a color filter CF and an over-coating layer 140 are disposed on the second insulation layer 130.

The black matrix BM may be provided by coating a material which blocks light on the second insulation layer 130, a sputtering process, an exposing process using a mask having a pattern and a developing process.

The color filter CF may be provided by coating a color-resist on the second insulation layer 130 on which the black matrix BM is disposed, an exposing process using a mask having a pattern and a developing process.

The over-coating layer 140 may be disposed on the black matrix BM and the color filter CF. In an exemplary embodiment, the over-coating layer 140 may include acrylic epoxy material, for example.

After the over-coating layer 140 is provided, a contact hole H is defined through the over-coating layer 140 and the black matrix BM so that a portion of the drain electrode DE is exposed.

Figure 13A:
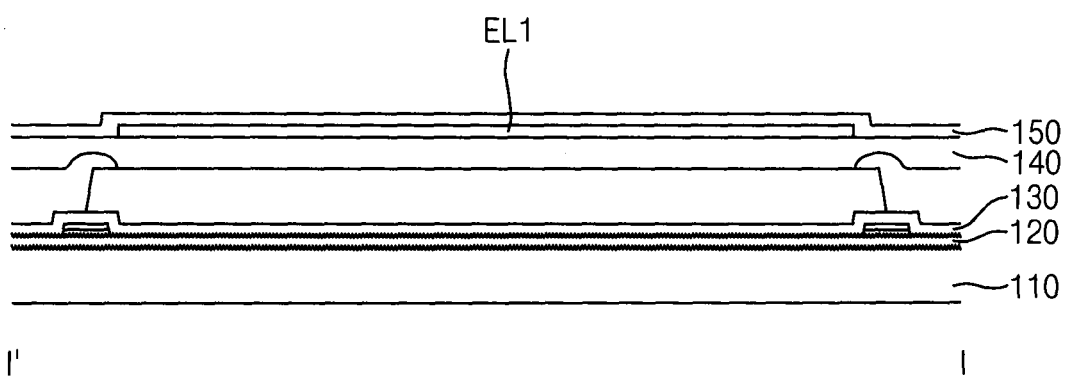
Figure 13B:
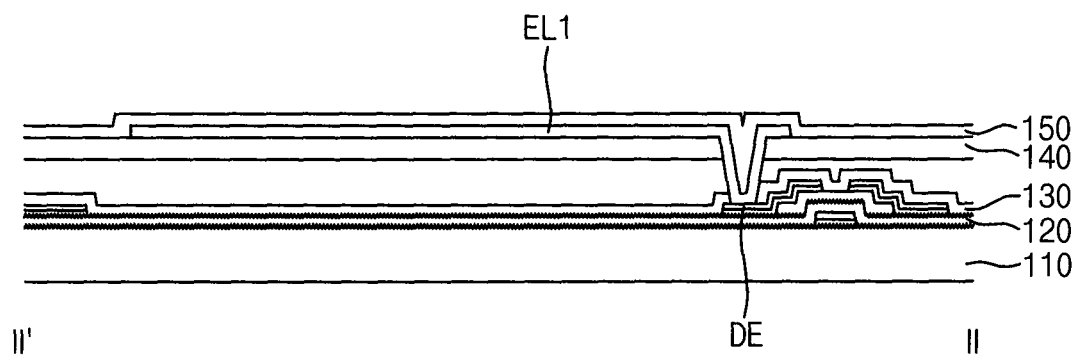
Figure 13C:
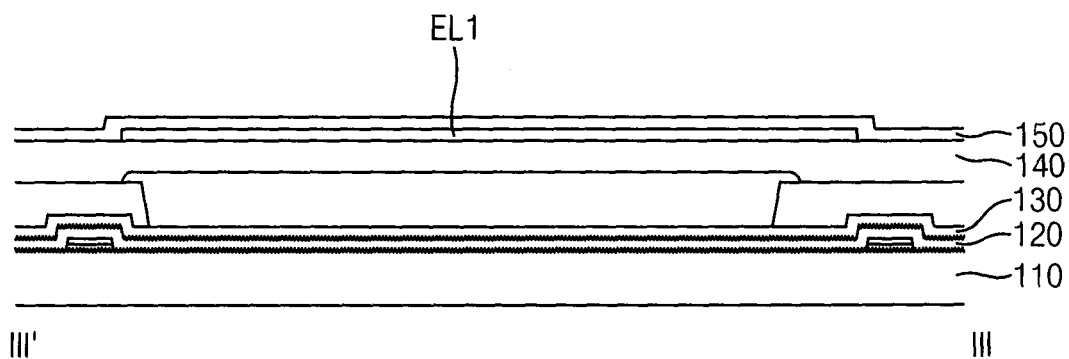

Referring to FIGS. 13A to 13C, the first electrode EL1 is disposed on the over-coating layer 140. The first electrode EL1 may be provided by providing a transparent conductive layer on the over-coating layer 140, and patterning the transparent conductive layer by a photolithography, for example. In an exemplary embodiment, the transparent conductive layer may include ITO, IZO and etc. In an exemplary embodiment, the transparent conductive layer may include titanium (Ti) and/or molybdenum titanium (MoTi), for example. The first electrode EL1 is electrically connected to the drain electrode DE through the contact hole H.

And then, a third insulation 150 is disposed on the first electrode EL1. The third insulation layer 150 includes an inorganic insulation material. In an exemplary embodiment, the third insulation layer 150 may be obtained by a CVD process, a spin coating process, a PECVD process, a sputtering process, a vacuum evaporation process, an HDP-CVD process, a printing process or etc.

Figure 14A:
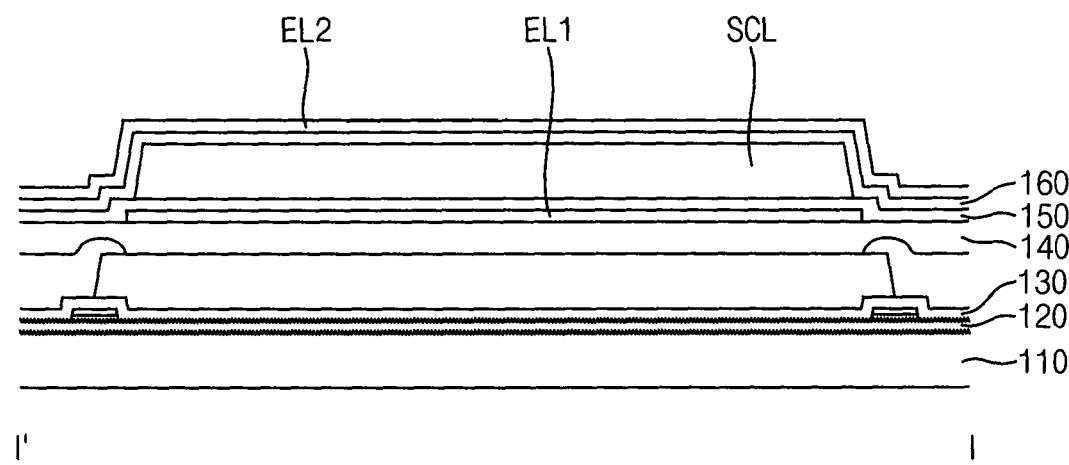
Figure 14B:
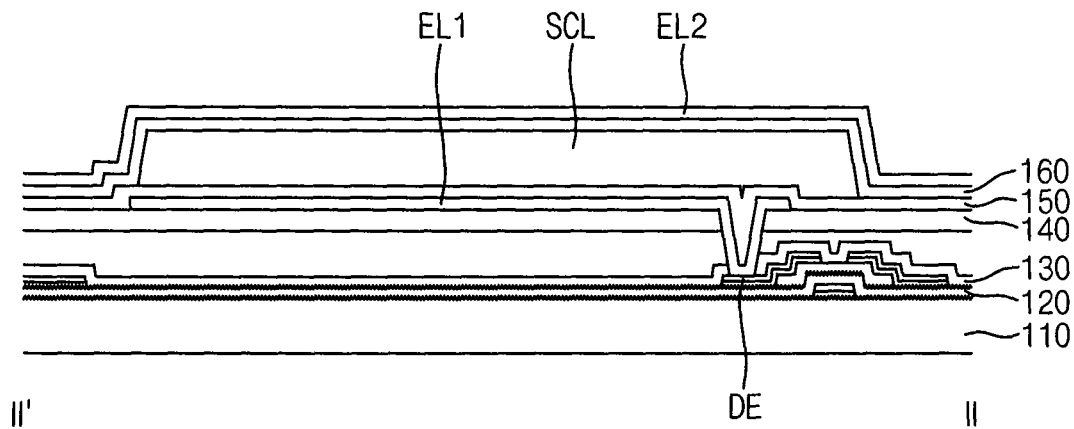
Figure 14C:
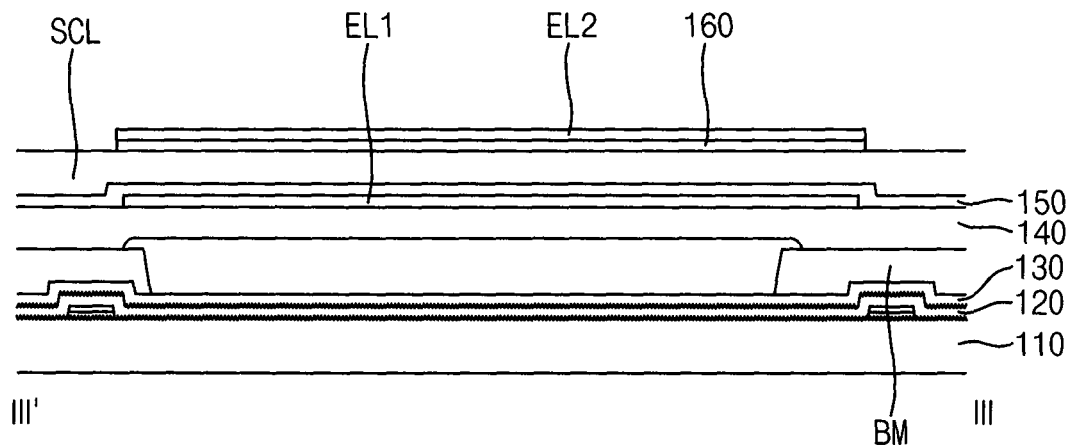

Referring FIG. 14A to 14C, a sacrificial layer SCL, a fourth insulation layer 160 and a second electrode EL2 are disposed on the third insulation layer 150.

The sacrificial layer SCL is disposed on the third insulation layer 150. The sacrificial layer SCL corresponds to a pixel area on which an image is displayed. In an exemplary embodiment, the sacrificial layer SCL includes an organic macromolecule material, such as an organic material including benzocyclobutene ("BCB") and acryl resin. In an exemplary embodiment, the sacrificial layer may be provided via evaporation and ashing process or evaporation and polishing process, for example. In an exemplary embodiment, the sacrificial layer may be provided via inkjet process or spin coating process, for example, and not limited thereto.

The sacrificial layer SCL will be removed later to define a tunnel-shaped cavity so that the sacrificial layer SCL has dimensions which is the same as that of the tunnel-shaped cavity in which an image displaying portion LC will be disposed.

A fourth insulation layer 160 is disposed on the third insulation layer 150 on which the sacrificial layer SCL is disposed. In an exemplary embodiment, the fourth insulation layer 160 includes inorganic insulating material, such as silicon nitride (SiNx) and silicon oxide (SiOx), for example. In an exemplary embodiment, the fourth insulation layer 160 may be obtained by a CVD process, a spin coating process, a PECVD process, a sputtering process, a vacuum evaporation process, an HDP-CVD process, a printing process or etc.

The second electrode EL2 is disposed on the fourth insulation layer 160. The second electrode EL2 is provided by providing a transparent conductive layer on the fourth insulation layer 160, and patterning the transparent conductive layer by a photolithography, for example. In an exemplary embodiment, the transparent conductive layer may include ITO, IZO and etc. In an exemplary embodiment, the transparent conductive layer may include titanium (Ti) and/or molybdenum titanium (MoTi), for example.

The sacrificial layer SCL is exposed by the fourth insulation layer 160 and the second electrode EL2 in an area which overlaps the black matrix BM in a plan view. Thus, the sacrificial layer SCL may be removed through the portion where the fourth insulation layer 160 and the second electrode EL2 are not provided. (refer to FIG. 15C)

Figure 15A:
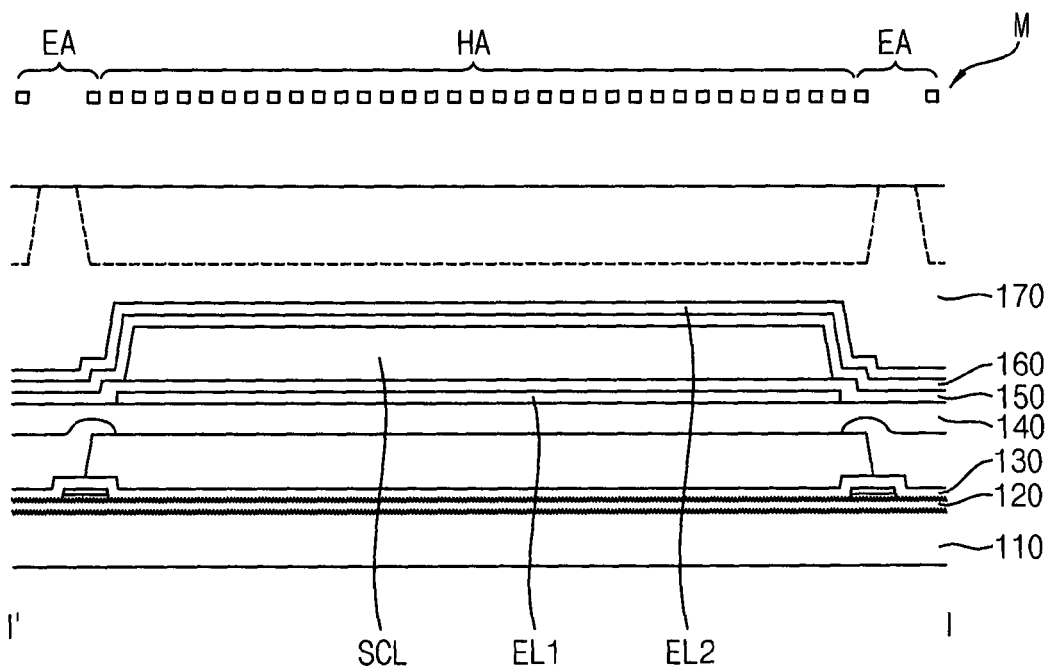
Figure 15B:
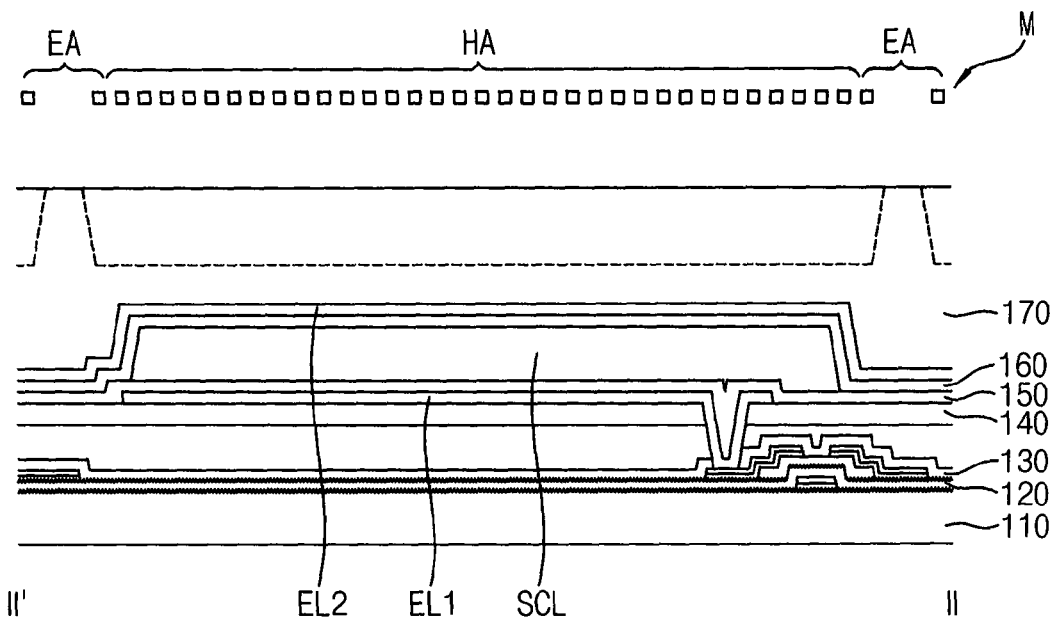
Figure 15C:
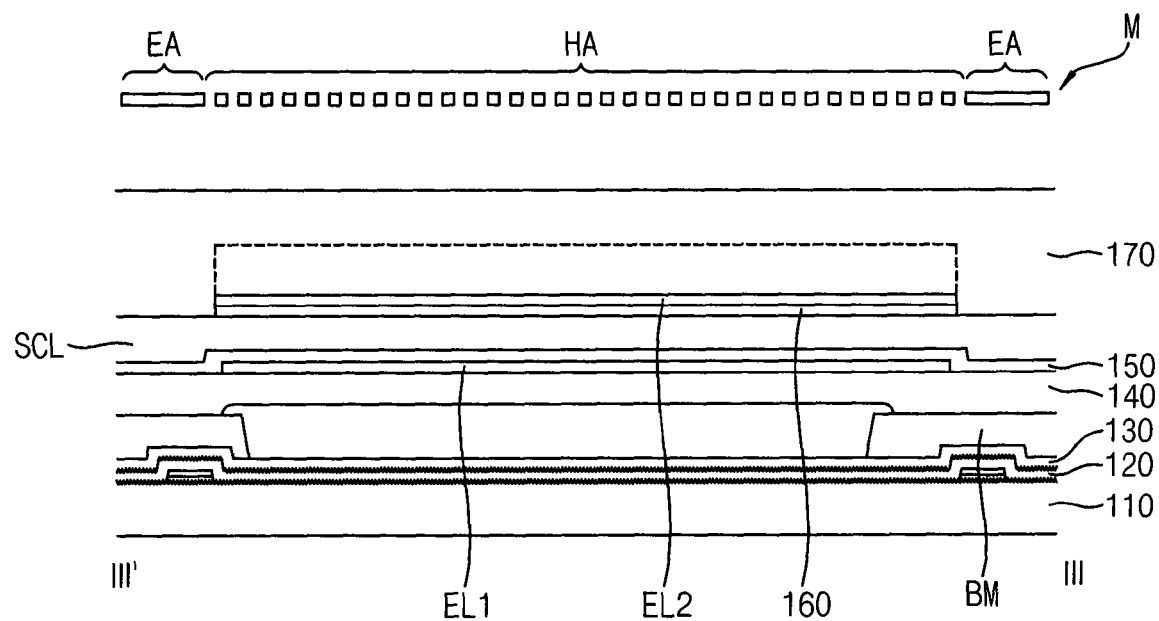

Referring to FIGS. 15A to 15C, a protecting layer 170 (refer to a dotted line in the figure) having a protrusion wall W (refer to FIG. 16A) is disposed on the second electrode EL2.

A photoresist including photosensitive organic material is coated on the second electrode EL2 and the sacrificial layer SCL. In an exemplary embodiment, the photoresist may be a negative photoresist. In the case of the negative photoresist, a portion not exposed to the light is removed through a development process, for example.

The photoresist includes two or more initiators reacting to different maximum energy absorption wavelengths from each other. In detail, the photoresist includes a first initiator, and a second initiator having the maximum energy absorption wavelength ($\lambda$max) different from that of the first initiator. The first and second initiators make the reaction degrees of the photoresist appear to be different from each other according to the wavelength of the light irradiated to the photoresist.

In an exemplary embodiment, the first initiator has the maximum energy absorption wavelength ($\lambda$max) greater than about 300 nanometers (nm) and equal to or smaller than about 600 nm. The first initiator should not be limited to a material having the above-mentioned maximum energy absorption wavelength ($\lambda$max), and thus the first initiator may be a titanocene-based initiator or an acetophenone-based initiator, for example.

In an exemplary embodiment, the second initiator may have the maximum energy absorption wavelength ($\lambda$max) from about 200 nm to about 300 nm. The second initiator should not be limited to a material having the above-mentioned maximum energy absorption wavelength ($\lambda$max), and thus the second initiator may include at least one of an ester-based initiator, an oxime-based initiator, an imidazole-based initiator, or a mercaptan-based initiator.

In an exemplary embodiment, the photoresist may be pre-baked (e.g., a soft bake) before the next exposure process is carried out.

Then, a mask M is disposed on the photoresist, and a first light is irradiated on the photoresist through the mask M to perform a first exposure process. The first light has a wavelength greater than about 300 nm and equal to or smaller than about 600 nm to correspond to the maximum energy absorption wavelength ($\lambda$max) of the first initiator. When the first light is irradiated on the photoresist, the polymerization reaction or the degradation reaction occurs on the photoresist by the first initiator.

The mask M has a blocking area which blocks light to completely remove the photoresist, a half area HA which partially blocks light to partially remove the photoresist, and a transparent area EA which passes light to completely remain the photoresist. The half area HA is disposed corresponding to an area where the protecting layer 170 will be provided. The transparent area EA is disposed corresponding to an area where the protrusion wall W of the protecting layer 170 will be provided. The blocking area is disposed corresponding to an area where the protecting layer 170 is not provided.

In an exemplary embodiment, a diffraction mask or a slit mask may be used for the half area HA of the mask M.

And then, the photoresist exposed through the first exposure process is developed. Accordingly, a portion of the photoresist remains and the other portion of the photoresist are removed according to the exposure amount in the first exposure process. In an exemplary embodiment, the photoresist is totally removed in the blocking, the photoresist is partially removed in the haft area HA, and the photoresist is remained in the transparent area EA. Accordingly, the protecting layer 170 and the protrusion wall W protruded from the protecting layer 170 may be provided.

After that, a second light is irradiated on the developed photoresist through a second exposure process. In an exemplary embodiment, the second light has a wavelength from about 200 nm to about 300 nm corresponding to the maximum energy absorption wavelength ($\lambda$max) of the second initiator. When the second light is irradiated on the developed photoresist, the polymerization reaction or the degradation reaction further occurs on the photoresist by the second initiator.

The exposure amount of the photoresist by the second light during the second exposure process is smaller than the exposure amount of the photoresist by the first light during the first exposure process. The polymerization reaction or the degradation reaction further occurs by the second exposure process, and thus the profile of the protrusion wall W may be controlled. That is, when an angle between the side surface of the protrusion wall W and the upper surface of the base substrate 110 is referred to as a taper angle, the taper angle may be controlled according to the exposure amount during the second exposure process.

Figure 16A:
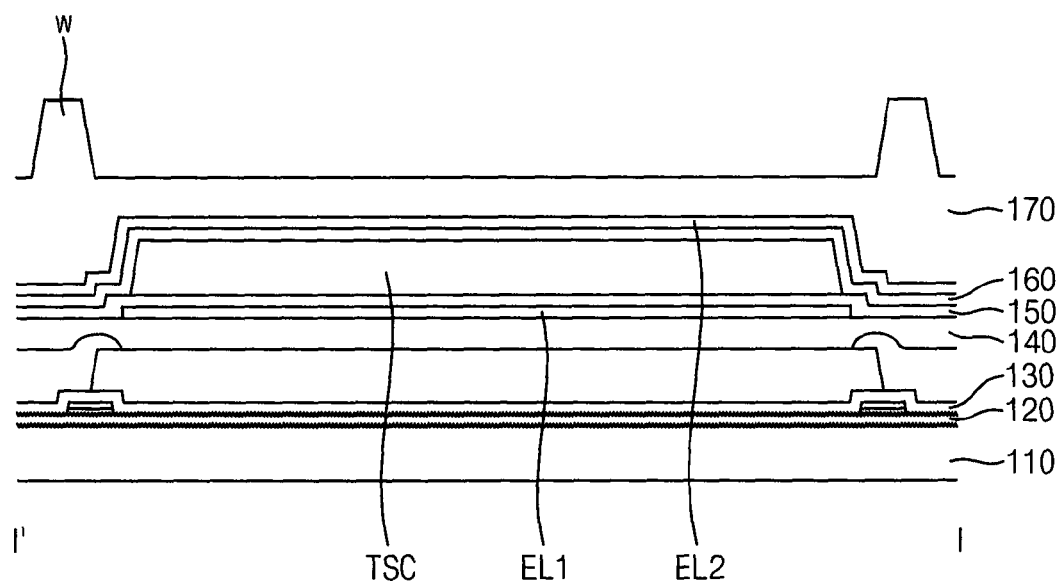
Figure 16B:
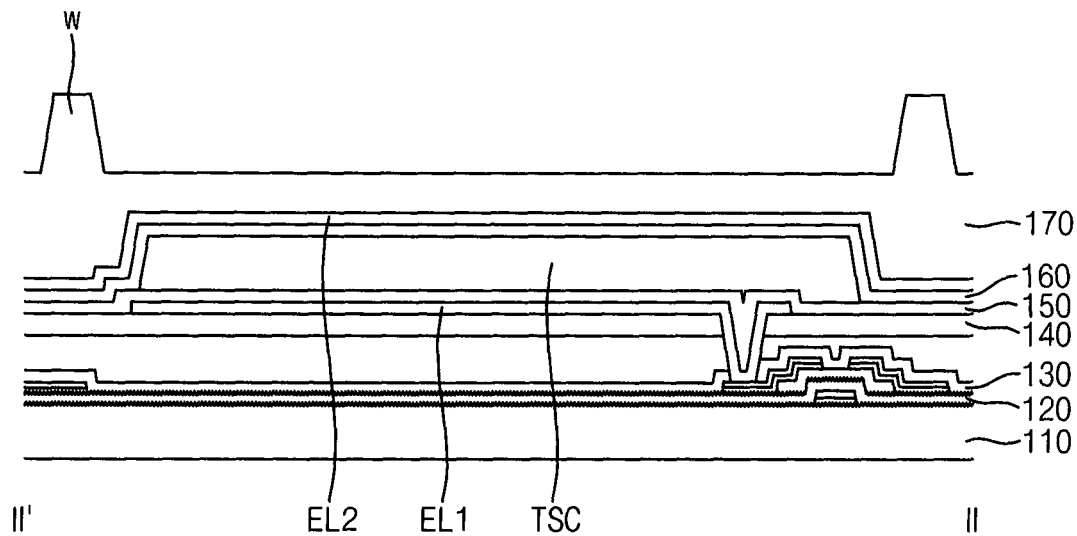
Figure 16C:
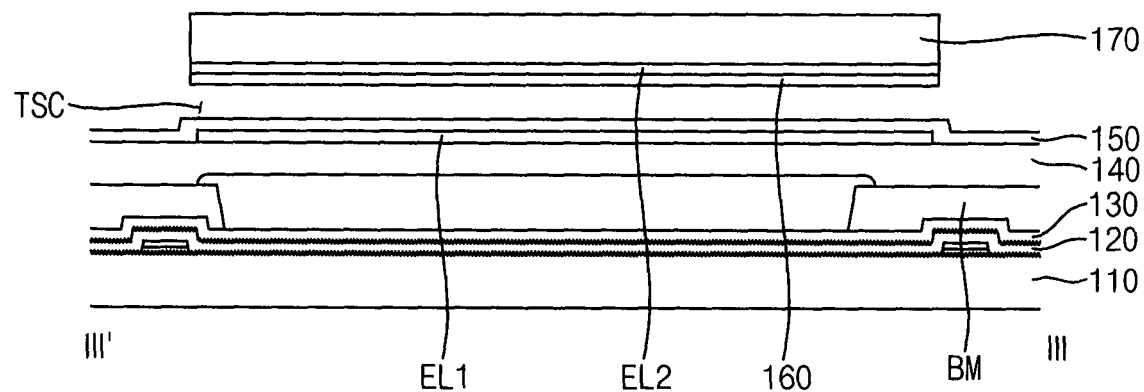

Referring to FIGS. 16A to 16C, a tunnel-shaped cavity TSC is defined by removing the sacrificial layer SCL.

In an exemplary embodiment, the sacrificial layer SCL is etched from the exposed portion of sacrificial layer SCL to an inside of the tunnel-shaped cavity TSC by an anisotropic plasma etching process, for example. Accordingly, a lower surface of the fourth insulation layer 160 and an upper surface of the third insulation layer 150 are exposed.

In an exemplary embodiment, the plasma process is for anisotropically removing organic layer, such as microwave O2 plasma, but the invention is not limited thereto. In an exemplary embodiment, stage temperature, chamber pressure, using gas of the microwave O2 plasma may be adjusted to etch only organic insulating material. Accordingly, the third insulation layer 150 and the fourth insulation layer 160 including inorganic insulating material are not etched. In the microwave O2 plasma etching process, the stage temperature of an etching chamber may be about 100 degrees Celsius (° C.) to about 300° C., an amount of O2 flow may be about 5000 standard cubic centimeters per minute ("sccm") to about 10000 sccm, an amount of diazene ($N_2H_2$) flow may be about 100 sccm to about 1000 sccm, pressure of the etching chamber may be about 2 torr (Torr), and applied power supply may be about 100 watts (W) to about 4000 W.

Figure 17A:
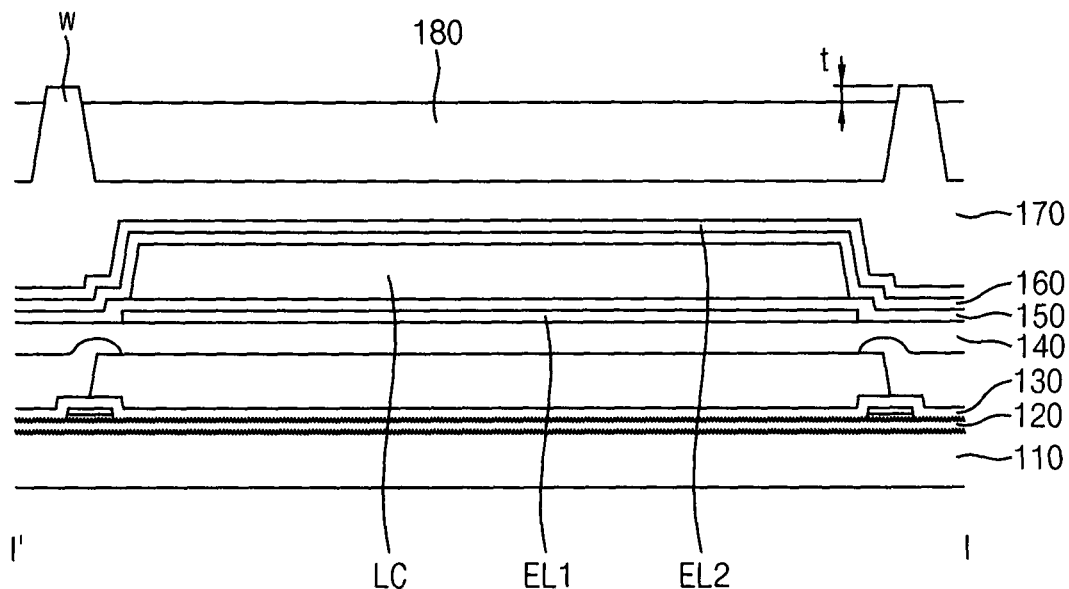
Figure 17B:
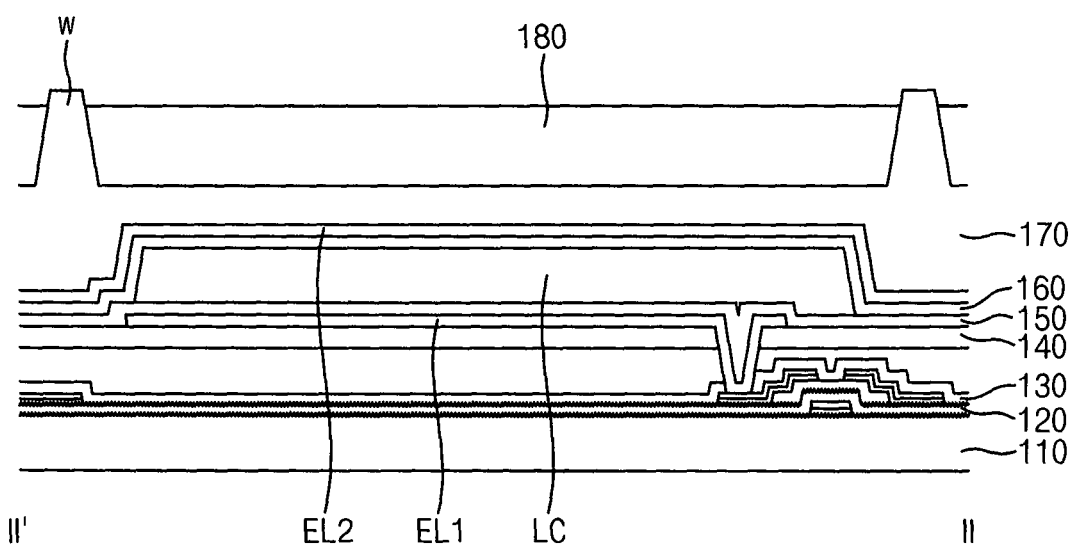
Figure 17C:
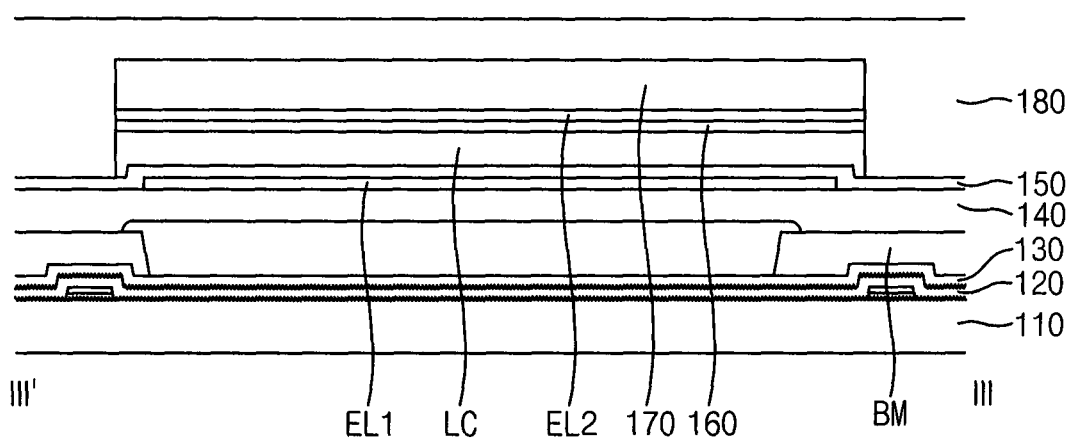

Referring to FIGS. 17A to 17C, an alignment layer (not shown) and an image displaying portion LC is provided in the tunnel-shaped cavity TSC (refer to FIGS. 16A to 16C). Then, a sealing layer 180 is disposed on the protecting layer 170 to seal the image displaying portion LC.

The alignment layer is disposed in the tunnel-shaped cavity. Thus, the alignment layer is disposed on the upper surface of the third insulation layer 150 and the lower surface of the fourth insulation layer 160. In an exemplary embodiment, the alignment layer is provided using an alignment solution. In an exemplary embodiment, the alignment solution may include a combination of alignment material, such as polyamide, and proper solvent such as polyamide, for example. The alignment solution is supplied in a liquid type so that the alignment solution moves in the tunnel-shaped cavity due to capillary phenomenon. In an exemplary embodiment, the alignment solution is supplied using inkjet with a micro pipette, or using vacuum injection equipment, for example. After that, the solvent is removed. The base substrate 110 may be stayed in a room temperature or heated to remove the solvent.

The alignment layer may be eliminated according to type of the liquid crystal layer, or shapes of the first and second electrodes EL1 and EL2. In an exemplary embodiment, when the first and second electrodes EL1 and EL2 have a specific pattern, then the alignment layer may be eliminated.

The image displaying portion LC is provided in the tunnel-shaped cavity TSC in which the alignment layer is provided. The image displaying portion LC may include liquid crystal molecules. The liquid crystal molecules are supplied in a liquid type so that the liquid crystal molecules move in the tunnel-shaped cavity due to capillary phenomenon. In an exemplary embodiment, the liquid crystal portion LC may be supplied using inkjet with a micro pipette, or using vacuum injection equipment, for example. Using the vacuum injection equipment, the hole is immersed into a container receiving the liquid crystal molecules, and then pressure of a chamber in which the container is disposed is decreased, then the liquid crystal molecules moves in the tunnel-shaped cavity due to capillary phenomenon.

The sealing layer 180 is disposed on the first insulation layer 150 and the protecting layer 170 to cover an exposed portion of the image displaying portion LC so that the image displaying portion LC is sealed. The sealing layer 170 includes semi-hardening macromolecule material. The macromolecule material may have liquidity before hardening. The semi-hardening macromolecule material having a flat shape is provided. Then, the flat shaped semi-hardening macromolecule material is disposed on the display panel and pressed to form the sealing layer 180. The semi-hardening macromolecule material may be supplied to a recessed portion of the display panel due to the liquidity.

Referring back to FIGS. 5 to 6C, after providing the sealing layer 170, an upper polarizer 200 is attached on the base substrate 110 opposite to the thin film transistor TFT with reference to the base substrate 110. The upper polarizer 200 includes an upper polarizing layer 220 and an attachable-detachable layer 210 disposed between the upper polarizing layer 220 and the substrate 110. The upper polarizer 200 may be fixed on the base substrate 110 by the attachable-detachable layer 220.

Figure 18:
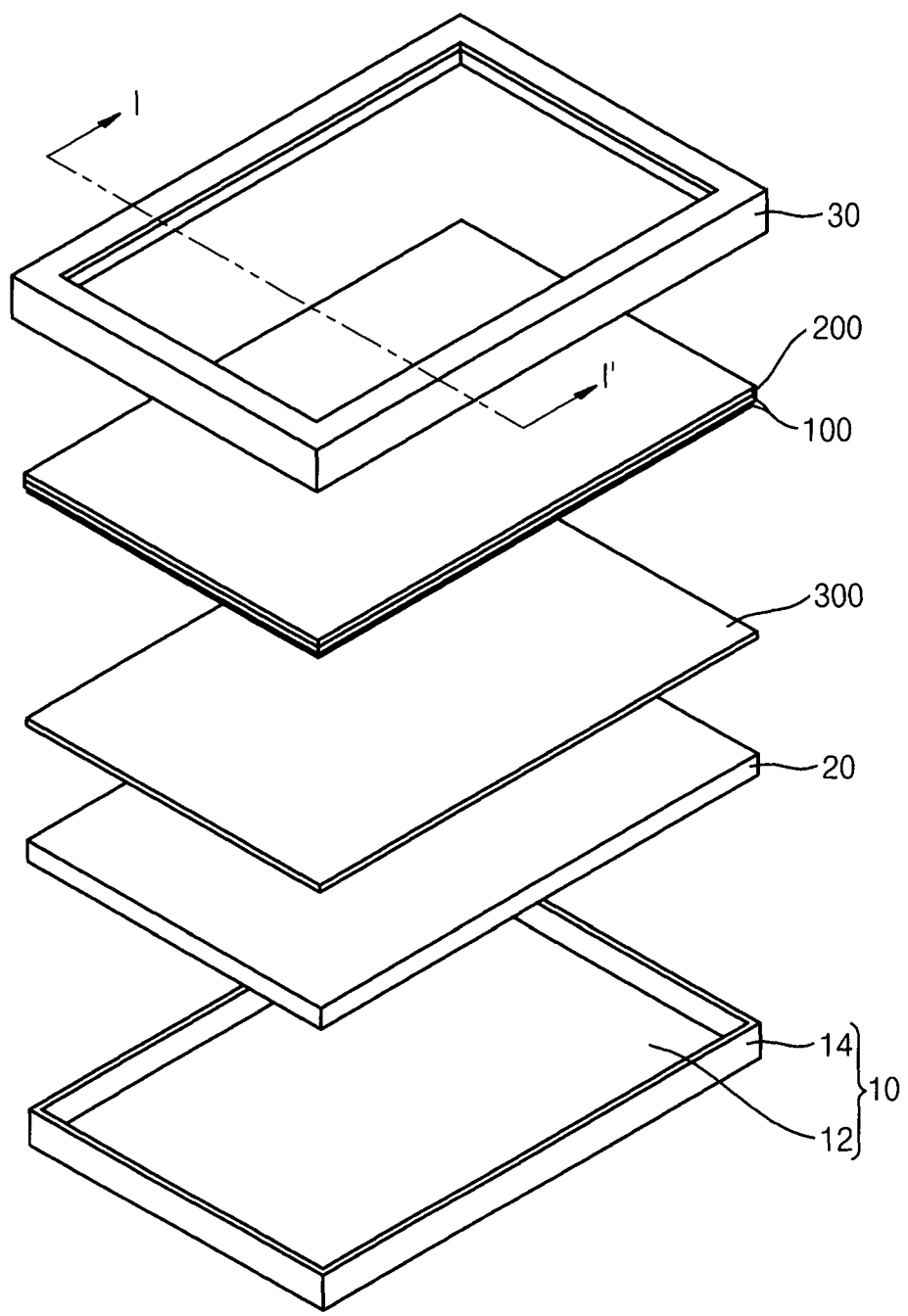
FIG. 18 is an exploded perspective view illustrating an exemplary embodiment of a display apparatus according to the invention.
Figure 19:
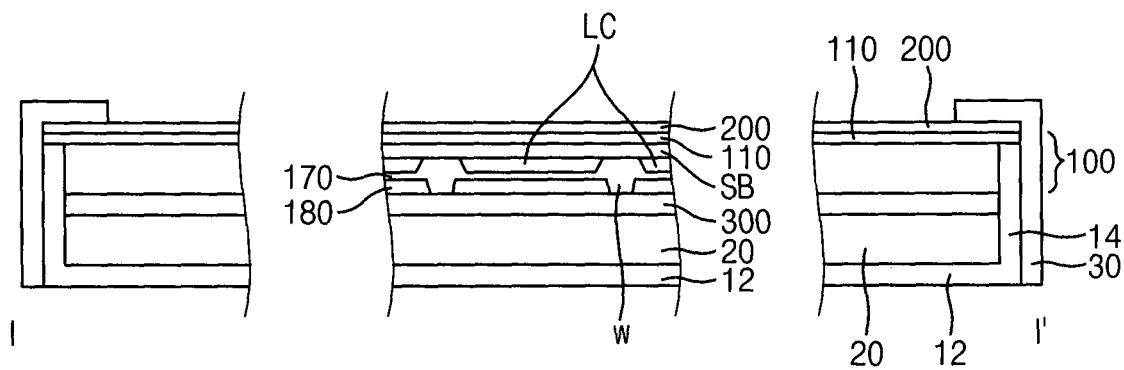
FIG. 19 is a cross-sectional view taken along line I-I' of FIG. 18.

FIG. 18 is an exploded perspective view illustrating a display apparatus according to an exemplary embodiment of the invention. FIG. 19 is a cross-sectional view taken along line I-I' of FIG. 18.

Referring to FIGS. 18 and 19, a display apparatus includes a receiving container including a bottom chassis 10 and top chassis 30, a backlight assembly 20, a lower polarizer 300, a display panel 100 and an upper polarizer 200.

The receiving container receives the backlight assembly 20, the lower polarizer 300, the display panel 100 and the upper polarizer 200. The bottom chassis 10 includes a bottom plate 12 and a sidewall 14 extending from edges of the bottom plate 12 in perpendicular to the bottom plate 12. The top chassis 30 is combined with the bottom chassis 10 to receive the backlight assembly 20, the lower polarizer 300, the display panel 100 and the upper polarizer 200.

The backlight assembly 20 provides light to the display panel 100. The backlight assembly 20 may include a light source to generate the light, a light guiding plate to guide the light to the display panel 100. The backlight assembly 20 is disposed on the bottom plate 12 of the bottom chassis 10, and makes contact to the bottom plate 12.

The backlight assembly 20 may further include an optical element (not shown) disposed between the light guiding plate and the lower polarizer 300. The optical element may be disposed between the display panel 100 and the light guiding plate. The optical element may improve optical property of the light from the light guiding plate. Thus, the optical element may make brightness of the light from the light guiding plate be uniform. The optical element may include plurality of optical sheets. In an exemplary embodiment, optical element may include a protecting sheet, a prism sheet and a diffusion sheet. The diffusion sheet is disposed on a light exiting surface of the light guiding plate. The prism sheet is disposed on the diffusion sheet. The protecting sheet is disposed on the prism sheet. The prism sheet may include an upper prism sheet and a lower prism sheet. An axis of the upper prism sheet may be substantially perpendicular to an axis of the lower prism sheet. Although the optical element is described including the protecting sheet, the prism sheet and the diffusion sheet, many modifications of the optical sheet may be possible.

The lower polarizer 300 is disposed on the backlight assembly 20. The upper polarizing layer 300 changes a light through passing the lower polarizer 300 into a polarized light. Although not shown in figures, the lower polarizer 300 may include a retardation layer retarding a phase of the light, a protecting film and etc. In an exemplary embodiment, the lower polarizer 300 may include polymer, such as polycarbonate, polystyrene, polyvinyl alcohol, poly methyl methacrylate, polypropylene, polyolefine, polyacrylate, polyamide and etc.

The lower polarizer 300 makes contact with the backlight assembly 20.

The display panel 100 displays an image using the light generated from the backlight assembly 20. The display panel 100 is substantially the same as a display panel 100 described in the FIGS. 1 to 2C. Thus, any further detailed descriptions concerning the same elements will be omitted.

The upper polarizer 200 is attached on the display panel 100. The upper polarizer 200 is substantially the same as an upper polarizer 200 of FIGS. 1 to 2C. Thus, any further detailed descriptions concerning the same elements will be omitted.

Referring back to FIG. 19, a display panel 100 includes a base substrate 110, a wiring layer SB having a thin film transistor disposed under the base substrate 110, a color filter and etc., an image displaying portion LC disposed under the wiring layer SB, a protecting layer 170 disposed under the image displaying portion LC and a sealing layer 180 disposed on the protecting layer 170. The protecting layer 170 surrounds side and lower surfaces of the image displaying portion LC and having a protrusion wall W.

The bottom plate 12 of the bottom chassis 10 makes contact with the backlight assembly 20, the backlight assembly 20 makes contact with the lower polarizer 300, and the lower polarizer 300 makes contact with the protrusion wall W, edges of an upper surface of the upper polarizer 200 which is attached on the base substrate 110 makes contact with the top chassis 30 so that the backlight assembly 20, the lower polarizer 300, the display panel 100 and the upper polarizer 200 may be firmly fixed in the receiving container.

Especially, the lower polarizer 300 which is disposed under the display panel 100 may make contact with the protrusion wall W. Thus, the lower polarizer 300 may be firmly fixed to the display panel 100 without an additional adhesive. In an exemplary embodiment, the protrusion wall W is protruded from the sealing layer 180 by a first height t (refer to FIG. 2A) so that the sealing layer 180 makes contact with the lower polarizer 300. Thus, the protrusion wall W presses the lower polarizer 300 so that the lower polarizer 300 may be firmly fixed to the display panel 100 without an additional adhesive.

In addition, boundaries of a lower surface of the base substrate 110 of the display panel 100 make contact with an upper surface of the side wall 14 of the bottom chassis 10. An external impact from outside of the display apparatus to display panel 100 may be transfer to the base substrate 110 which is respectively strong structure so that damage to the image displaying portion LC of the display panel 100 may be substantially reduced.

Figure 20:
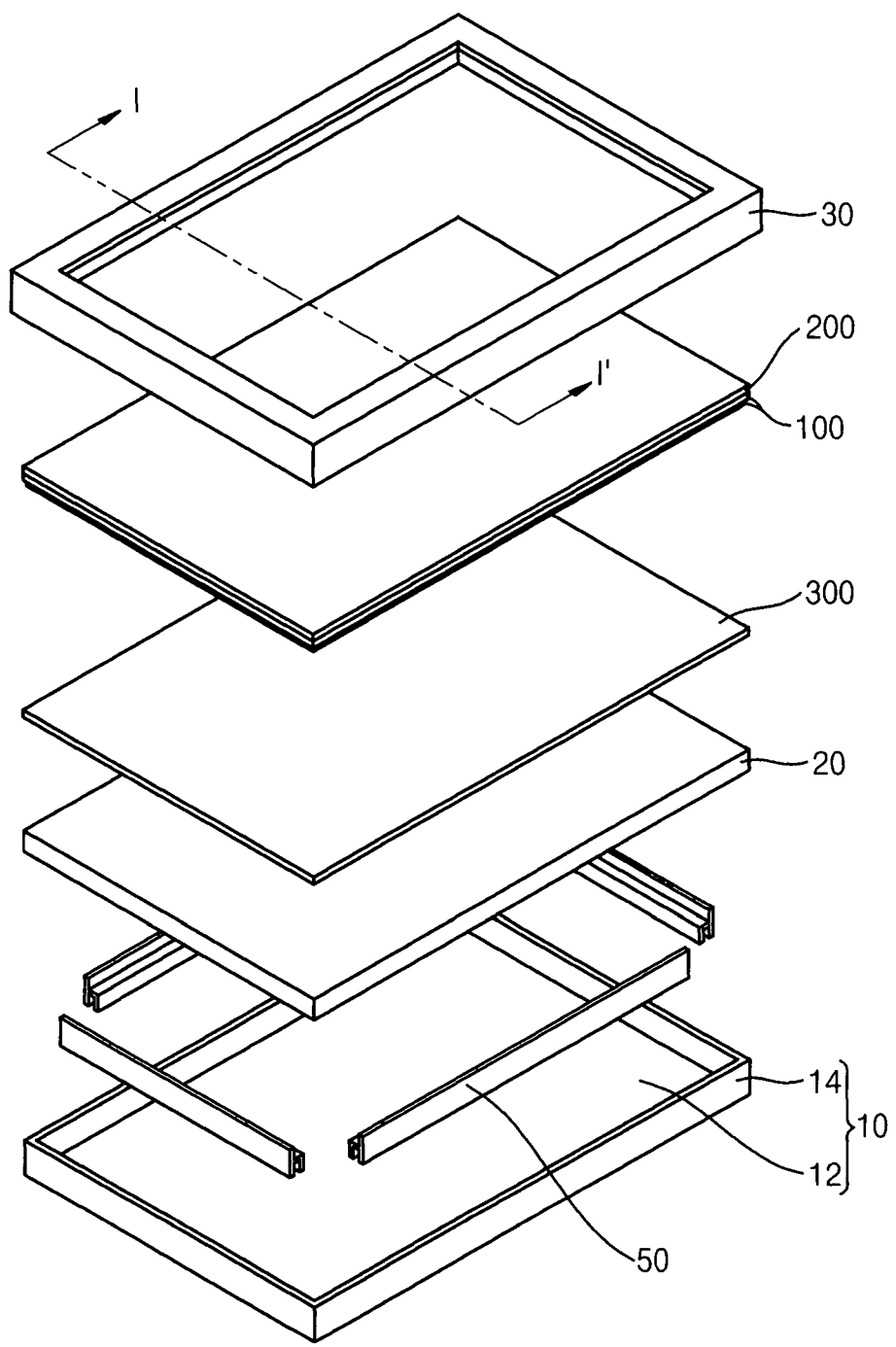
FIG. 20 is an exploded perspective view illustrating an exemplary embodiment of a display apparatus according to the invention.
Figure 21:
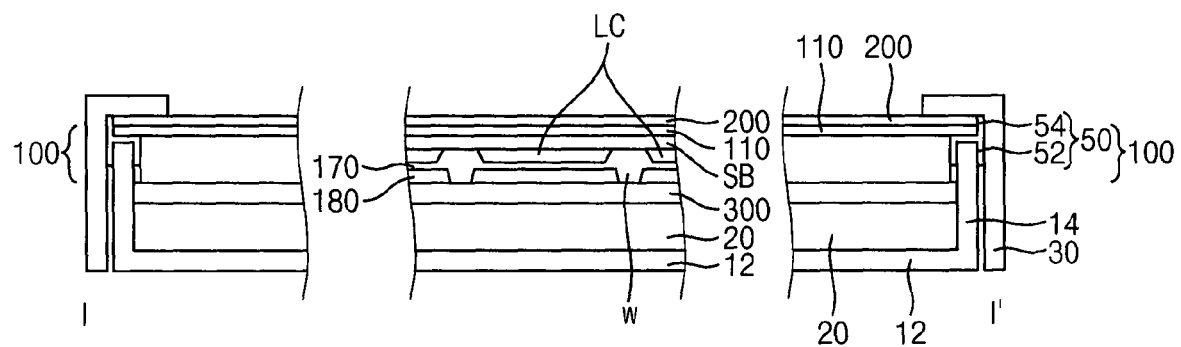
FIG. 21 is a cross-sectional view taken along line I-I' of FIG. 20.

FIG. 20 is an exploded perspective view illustrating a display apparatus according to an exemplary embodiment of the invention. FIG. 21 is a cross-sectional view taken along line I-I' of FIG. 20.

Referring to FIGS. 20 and 21, a display panel may be substantially the same as a display panel of FIGS. 18 and 19, except for a buffer element. Thus, any further detailed descriptions concerning the same elements will be briefly described or be omitted.

The display apparatus includes a receiving container including a bottom chassis 10 and top chassis 30, a buffer element 50, a backlight assembly 20, a lower polarizer 300, a display panel 100 and an upper polarizer 200. The bottom chassis 10 includes a bottom plate 12 and a side wall 14. The display panel 100 includes a base substrate 110, a wiring layer SB, an image displaying portion LC, a protecting layer 170 having a protrusion wall W and a sealing layer 180.

The buffer element 50 includes a first portion 52 and a second portion 54 connected to the first portion 52. The first portion 52 surrounds an upper portion of the side wall 14 of the bottom chassis 10. The first portion 52 may make contact to boundary of a lower surface of the base substrate 110 of the display panel 100. Thus, the first portion 52 is disposed between the boundary of the lower surface of the base substrate 110 and the side wall 14 of the bottom chassis 10. The second portion 54 extends from the first portion 52, and disposed between side of the base substrate 110 of the display panel 100 and the top chassis 30.

Accordingly, an external impact from outside of the display apparatus to the display panel passes through the buffer element 50 and transmitted to the base substrate 110 which is a relatively strong structure so that a damage to the image displaying portion LC of the display panel 100 may be decreased.

According to the invention, an upper polarizer of a display panel is attached on a base substrate, and a lower polarizer makes contact with a protrusion wall of a protecting layer so that re-work for the upper and lower polarizer may be easy, and damage an image displaying portion of the display panel may be effectively prevented.

In addition, an external impact to the display panel may be dispersed so that the image displaying portion of the display panel may be protected.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A display panel comprising:
   a base substrate;
   a gate line disposed under the base substrate and extending in a first direction;
   a data line disposed under the base substrate and extends in a second direction substantially perpendicular to the first direction;
   a thin film transistor disposed under the base substrate, and electrically connected to the gate line and the data line;
   a first electrode disposed under the base substrate and electrically connected to the thin film transistor;
   an image displaying portion disposed under the first electrode and overlapped with the first electrode;
   a protecting layer disposed under the image displaying portion, surrounding a lower surface of the image displaying portion and both sides of the image displaying portion in the second direction, and comprising a protrusion wall protruded in a direction opposite to the base substrate; and
   an upper polarizer disposed on the base substrate and opposite to the thin film transistor with reference to the base substrate.

2. The display panel of claim 1, wherein the protrusion wall of the protecting layer overlaps the data line.

3. The display panel of claim 2, further comprising:
   a sealing layer which is disposed under the protecting layer, and contacts a side surface of the image displaying portion in the first direction.

4. The display panel of claim 3, wherein the protrusion wall of the protecting layer is higher than the sealing layer with reference to the base substrate.

5. The display panel of claim 4, further comprising:
   a lower polarizer which is disposed under the protecting layer and the sealing layer, and contacts the protrusion wall of the protecting layer.

6. The display panel of claim 5, wherein the protrusion wall is protruded from the sealing layer by less than about 10 micrometers.

7. The display panel of claim 1, further comprising:
   a second electrode disposed between the image displaying portion and the protecting layer.

8. The display panel of claim 1, further comprising:
   a color filter disposed between the base substrate and the first electrode.

9. The display panel of claim 8, further comprising:
   a black matrix which is disposed between the base substrate and the protecting layer, contacts the color filter, and is overlapped with the thin film transistor.

10. The display panel of claim 1, further comprising:
    a color filter which is disposed under the protecting layer, and contacts a side of the protrusion wall of the protecting layer.

11. The display panel of claim 10, further comprising:
    a black matrix which is disposed under the protecting layer, contacts the color filter, overlapped with the thin film transistor, and contacts a side surface of the image displaying portion in the first direction.

12. The display panel of claim 7, further comprising:
    a first insulation layer disposed under the base substrate under which the gate line is disposed, and disposed between the gate line and the data line;

a second insulation layer disposed under the first insulation layer under which the data line is disposed, and between the data line and the first electrode;

a third insulation layer disposed between the first electrode and the image displaying portion; and a fourth insulation layer disposed between the image displaying portion and the second electrode.

13. The display panel of claim 12, wherein the base substrate includes a glass substrate, an embossing pattern is provided on a lower surface of the base substrate, the gate line comprises a first gate layer disposed under the lower surface of the base substrate and a second gate layer disposed under the first gate layer, the first gate layer comprises copper oxide, and the second gate layer comprises copper, and the first insulation layer comprises silicon dioxide.

14. The display panel of claim 13, wherein an embossing pattern is provided on a lower surface of the first insulation layer, the data line comprises a first data layer disposed under the lower surface of the first insulation layer and a second data layer disposed under the first data layer, the first data layer comprises copper oxide, and the second data layer comprises copper, and the second insulation layer comprises silicon dioxide.

15. A display apparatus comprising:

a display panel which comprises:

a base substrate;

a gate line disposed under the base substrate and extending in a first direction;

a data line disposed under the base substrate and extends in a second direction substantially perpendicular to the first direction;

a thin film transistor disposed under the base substrate, and electrically connected to the gate line and the data line;

a first electrode disposed under the base substrate and electrically connected to the thin film transistor;

an image displaying portion disposed under the first electrode and overlapped with the first electrode; and a protecting layer disposed under the image displaying portion, surrounding a lower surface of the image displaying portion and both sides of the image displaying portion in the second direction, and comprising a protrusion wall protruded in a direction opposite to the base substrate;

an upper polarizer disposed on the display panel;

a backlight assembly disposed under the display panel to provide light to the display panel;

a lower polarizer disposed between the display panel and the backlight assembly;

a receiving container which receives the display panel, the upper polarizer, the backlight assembly and the lower polarizer;

wherein the protrusion wall of the display panel contacts the lower polarizer, the lower polarizer contacts the backlight assembly, and the backlight assembly contacts the receiving container.

16. The display apparatus of claim 15, wherein the receiving container comprises a bottom plate, and a side wall which extends from an edge of the bottom plate and is perpendicular to the bottom plate, and the side wall contacts boundaries of a lower surface of the base substrate.

17. The display apparatus of claim 16, further comprises:

a buffer element disposed between the boundaries of the lower surface of the base substrate and the side wall of the receiving container, and comprising an elastic material.

18. A method of manufacturing a display panel comprising:

disposing a first electrode on a base substrate on which a thin film transistor is disposed;

disposing a sacrificial layer on the first electrode;

disposing a second electrode on the sacrificial layer;

disposing a protecting layer including having a protrusion wall protruded along a direction opposite to the base substrate on the second electrode;

removing the sacrificial layer to define a tunnel-shaped cavity between the first electrode and the second electrode;

disposing an image displaying portion in the tunnel-shaped cavity; and attaching an upper polarizer on the base substrate opposite to the image displaying portion with reference to the base substrate.

19. The method of claim 18, wherein disposing the protecting layer comprises:

coating a photoresist having a photosensitive organic material on the second electrode;

irradiating the photoresist using a mask having a blocking area, a half area and a transparent area, wherein the blocking area completely blocks light, the half area partially blocks light and the transparent area passes light; and developing the photoresist which is irradiated to form the protecting layer.

20. The method of claim 18, further comprises providing the thin film transistor, wherein providing the thin film transistor comprises:

providing an embossing pattern on the base substrate;

disposing a first layer comprising a metal oxide on the base substrate on which the embossing pattern is provided;

disposing a second layer comprising a metal on the first layer;

providing a wiring by patterning the first and second layers; and disposing a first insulation layer on the wiring.

* * * * *